United States Patent
Magdalena

(10) Patent No.: US 11,305,192 B2
(45) Date of Patent: Apr. 19, 2022

(54) COMPUTER SYSTEMS AND ASSOCIATED METHODS FOR CONTROLLING A USER INTERFACE RESPONSIVE TO USER ENGAGEMENT

(71) Applicant: KING.COM LIMITED, St. Julians (MT)

(72) Inventor: Ignacio Pintos Magdalena, Barcelona (ES)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 16/451,389

(22) Filed: Jun. 25, 2019

(65) Prior Publication Data
US 2019/0308101 A1    Oct. 10, 2019

Related U.S. Application Data

(63) Continuation of application No. 15/496,376, filed on Apr. 25, 2017, now Pat. No. 10,335,681.

(30) Foreign Application Priority Data

Apr. 25, 2016  (GB) ...................................... 1607171

(51) Int. Cl.
*A63F 13/837* (2014.01)
*A63F 13/537* (2014.01)
*A63F 13/46* (2014.01)
*A63F 13/69* (2014.01)

(52) U.S. Cl.
CPC ............ *A63F 13/537* (2014.09); *A63F 13/46* (2014.09); *A63F 13/69* (2014.09); *A63F 13/837* (2014.09)

(58) Field of Classification Search
None
See application file for complete search history.

(56) References Cited

U.S. PATENT DOCUMENTS

| 2014/0221088 A1 | 8/2014 | Perez et al. |
| 2014/0370950 A1 | 12/2014 | Jaksch et al. |
| 2015/0141148 A1 | 5/2015 | Jaksch et al. |

OTHER PUBLICATIONS

Panda Pop via YouTube video, "Panda Pop level 146 No boosters", https://www.youtube.com/watch?v=ZTTDT0Lh8U, Sep. 8, 2014 (Year: 2014).*
Panda Pop—Android Apps via Wayback Machine, https://web.archive.org/web/20140222004045/https://play.google.com/store/apps/details?id=com.sgn.pandapop.gp, Feb. 22, 2014 (Year: 2014).*

(Continued)

*Primary Examiner* — Damon J Pierce
(74) *Attorney, Agent, or Firm* — Saul Ewing Arnstein & Lehr LLP

(57) ABSTRACT

A computer implemented method of controlling a user interface of a computer device which is responsive to user engagement with displayed player objects on the interface. The method comprises steps implemented by computer executable code (executed by one or more hardware processors on the computer device) and encompassing, but not limited to, displaying a game area with a number of game objects in a static player graph as well as providing a player object which can be selected to target and shoot game objects in response to player behaviour or to contribute directly to a game objective. A boost action is triggered when game objective is fulfilled.

18 Claims, 20 Drawing Sheets

(56) References Cited

OTHER PUBLICATIONS

Bust-A-Move 4 via YouTube video, "Bust-a-Move 4 . . . (PS1)", https://www.youtube.com/watch?v=L_dPunpImHg, Aug. 14, 2014 (Year: 2014).*
International Search Report, dated Jul. 19, 2017, and Written Opinion issued in International Application No. PCT/GP2017/059831 , dated Jul. 19, 2017.
Anonymous, et al.,"Puzzle Bobble—Wikipedia, Retrieved from the Internet: URL: https://en.wikipedia.org/w/index.php?title=Puzzle_Bobble&oldid=715881789 —retrieved on Jul. 11, 2017] Sec. Gameplay", p. 2 XP055389673 ,Apr. 18, 2016.

* cited by examiner

COMPUTER SYSTEMS AND ASSOCIATED METHODS FOR CONTROLLING A USER INTERFACE RESPONSIVE TO USER ENGAGEMENT

CROSS-REFERENCE TO RELATED APPLICATIONS

This application is a continuation of U.S. application Ser. No. 15/496,376, filed Apr. 25, 2017, which is based on, and claims priority to, GB Application No. GB1607171.4, filed Apr. 25, 2016, the entire contents of each of which being fully incorporated herein by reference.

FIELD OF THE INVENTION

This disclosure relates to controlling a user interface responsive to user engagement with displayed objects on the interface of a computer device

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

There are therefore many technical challenges when designing computer implemented games, particularly in providing a challenge to a player that is engaging and rewarding so as to provoke repeat play. This particularly may, but not exclusively, apply to "casual games".

There exists different kinds of "bubble shooter" games. These games provide a static bubble graph in the game board on a display of a computer device. The game objective is to remove bubbles to clear the way through the graph, and to do this the player operates a player object launcher that can shoot player objects into the game board. When the launched player object reaches an object in the player graph, it "sticks" to it, and if it hits a game object of the same type as the player object, which already has another game object of the same characteristic adjacent to it, a 3-match condition is created and the three game objects disappear from the game board. A match could have more than three game objects in it. A match can be associated with a certain score.

A situation can occur in such games where there are no suitable sets or combinations of game objects in the player graph which could be shot either to move a step forward to the game objective, or to increase a player's score. A player's score can, for example, be increased when a match condition is made. This can be frustrating for a player and can cause players to become disengaged with the game.

SUMMARY OF THE INVENTION

According to an aspect, of the invention, there is provided a computer implemented method of controlling a user interface of a computer device responsive to user engagement with displayed player objects on the interface, the method comprising the following steps implemented by computer executable code executed by one or more processors on the computer device:

displaying a game area having a plurality of game objects in a static player graph;

providing a player object configured for targeting and shooting of said game objects in response to user input, the player object configured to respond to user input to selectively perform one of (i) travel along a player selected trajectory to target one of the plurality of game objects in the static player graph; and (ii) be selected to contribute directly to an objective and be deselected from targeting game objects in the static player graph; and detecting fulfillment of the objective to trigger a boost action.

The boost action can be implemented in such a way as to cause a disruptive game element to be released into the game area to remove multiple game objects from the static graph. This could happen as a direct consequence of detecting fulfillment of the objective.

Alternatively, where multiple player objects are sequentially provided in the game area, the boost action could be implemented to replace a next player object to be provided in the game area with a disruptive game element. The disruptive game element could be selected by a user in the same way as a player object and, when selected, remove multiple game objects from the player graph.

The features described above allow an "active" participation of the user in contributing to an objective that can provide him with a boost action. The game can also provide a "passive" contribution to the objective when game objects are removed from the static player graph in a match condition. A user may play the game by allowing the objective to be contributed to and fulfilled only by the passive contributions, but where a situation arises in the static player graph where a user can see that even skilled targeting using the player object will not allow matches to be made, he can instead choose to select the player object to contribute directly to the objective and to be deselected from targeting the game objects. In some embodiments, a finite number of player objects is provided for each static graph rendered on the user interface. The finite number is decremented each time one of the player objects is provided in the game area. Therefore, a user must determine for each player object using his skill and judgement whether it is best utilised to shoot into the static player graph to target a particular game object to make a match, or whether it might best be utilised to contribute directly to the objective. This significantly increases user engagement with the game.

In a so-called bubble shooter-type game, the game objects represent bubbles. The game objects have object characteristics (such as colour or type) and the static player graph comprises game objects of matching characteristics and different characteristics. The player object is rendered with a visual appearance resembling the game objects, and having a player object characteristic. The player object characteristic can be therefore matched to the characteristics of the game objects in the static player graph. When one of the game objects is successfully targeted by the player object and has an object characteristic matching the object characteristics of the player object, and is adjacent to at least one other game object sharing a matching object characteristic, the matching game object, the player object and the at least one other game object are removed from the static player graph. This is referred to as an n-match condition, where n denotes the number of touching matching game objects.

Reference to a "static" player graph denotes a graph in which the game objects (i.e. bubbles) have a fixed relationship to one another at the commencement of a level or session. The graph itself could move on the game board (for example, it could spin round) while not changing the relationship between the game objects.

In the embodiments described below, the objective is referred to as a "container objective". This is because a container is visually indicated on the user interface to represent the fact that player objects are put into the container to directly contribute to the objective whether the container is shown or not, the user can directly contribute to the objective. However, it will be apparent that it is not necessary to show a container or other object on the user interface whether the container is shown or note, the user can directly contribute to the objective by selecting a marked location displayed on the interface, the marked location separate from the player graph. When the container is displayed, the marked location can be in the vicinity of the displayed container. The marked location can be selected by direct user interaction with the marked location on the display. For a touch screen this can be done by the user touching the marked location, dragging and dropping the player object to the marked location by touch, or dragging the player object towards, but not all the way to, the marked location. Alternatively, in an environment where a cursor is being used to play the game, the cursor can be controlled to directly select the marked location on the display, or drag and drop the player object into the marked location. In an alternative embodiment, the player object could be directed towards the marked location in a shooting action, similar to that which would be used to target game objects in the static player graph. Note however, that the marked location is located on the display separate from the player graph. In the embodiments described below, the marked location associated with the objective (the container objective) is visually rendered on the interface by a targetable game object which resembles game objects of the static player graph. In alternative embodiments, it could be visually represented by other visual forms.

The level of fulfillment of the objective can be visually indicated at the marked location. Where the marked location is visually rendered as some kind of object, the level of fulfillment of the objective can be visually indicated by partially shading the object. In the described embodiments below, the level of opacity of different parts of the object is altered depending on the level of fulfillment of the objective. Where the object resembles a targetable game object (such as a bubble), different areas of the bubble have their opacity altered as a visual indicator of fulfillment towards the objective. Other visual indicators could be utilised, for example a bar with an increasing length coloured in, or by changing colours. There are many different ways to indicate the level of fulfillment of an objective.

When a contribution to the objective is made in a "passive" manner, the match can be associated with a score which depends on the number of touching game objects having matching characteristics. This score is used to increase the contribution towards fulfillment of the objective. The method can comprise the step of monitoring the level of fulfillment towards the objective and detecting that the objective is fulfilled when a threshold score is met. Active selection of player objects to contribute to that score are taken into account. In some embodiments, the respective contributions may be associated with a weight. Active contributions may be associated with a higher weight than passive contributions, thereby contributing to the fulfillment of the objective at a higher rate.

In the embodiments described below, the boost action causes a disruptive game element to act (or to be available for a user to select) which removes multiple game objects from the static graph. However, it will readily be appreciated that other boost actions could be appropriate once the objective has been fulfilled.

In the following described embodiments a computer infrastructure is described which addresses certain challenges in delivering the above-mentioned features. In the described embodiment, each player object comprises an object stored in computer memory having at least one attribute representing a behaviour of the player object. The behaviour can be managed by a table of reactions stored in association with the behaviour, the table of reactions defining for an event received by the player object a reaction depending on the event. A container entity may be provided to manage the marked location (and the container when present). The container entity can be configured to detect events contributing to the objective and to augment a variable stored in the container memory, the variable representing the level of fulfillment to the objective.

A shooter entity can be provided to manage a queue of player objects stored in a shooter memory.

The container entity can be configured to monitor the variable stored in container memory and when the variable meets or exceeds the threshold score to trigger game logic to add the disruptive game element to the queue, to make it available for shooting responsive to user input.

An event dispatcher can be provided to detect events arising from user input at the interface, and to pass these to one of the container entity and the shooter entity depending on the selection made by the user. This selection thus defines the event type as a container type event or a shooter type event indicated by the user.

Certain player objects may be registered to receive events from the event dispatcher and to react to said events depending on the event type. These player objects can represent bubbles.

According to another aspect to the present invention there is provided a computer device comprising:

a user interface configured to receive user input engaging with displayed player objects on the interface;

a memory storing computer executable codes; and one or more processes which are configured to execute the computer executable code to carry out the methods described in the foregoing.

Another aspect to the invention provides a computer device comprising:

a user interface responsive to user input when engaging with displayed player objects on the interface;

one or more processes arranged to execute computer executable code to configure a shooter entity for managing a queue of player objects stored in a shooter memory, and a container entity for managing a marked location displayed on the interface and associated with an objective;

rendering logic for displaying a game area on the interface with a plurality of game objects in a static player graph;

an event dispatcher responsive for detecting events of user input at the user interface and for providing said events selectively to the shooter entity or the container entity depending on the type of event; and game logic for providing a player object configured for targeting and shooting of said plurality of game objects in the static player graph in response to user input, the player object configured to respond to an event which is:

from the shooter entity, to travel along a player-selected trajectory to target one of the plurality of game objects in the static player graph, or from the container entity, to be selected to contribute directly to an objective with which the marked location is associated.

Another aspect of the invention provides a computer implemented method of controlling a user interface of a computer device responsive to user engagement with displayed objects on the interface, the method comprising the following steps implemented by computer executable code executed by one or more hardware processors on a computer device:

generating a game board on a user interface, the game board displaying user actuatable game elements;

associating at least one of the game elements with a releasable icon;

detecting user input and controlling the user interface responsive to the user input to remove from the display at least three game elements on detection of a match game condition in which at least three game elements having matching characteristics form a contiguous set on the game board;

on detection of the match condition, releasing the releasable icon and selecting a different game element on the game board for association with the released releasable icon; and detecting if the released icon is now associated with a game element in a match condition with other elements, and if so removing the game elements of the match condition from the game board without user input.

This feature is described in the following embodiment in the context of a bubble shooter game, wherein the releasable icon is a fairy. However, the concept of setting up a chain reaction by releasing an icon, the icon travelling to a different game element, can be utilised in other games. For example, in the game of Candy Crush, in which matches are made not by shooting but by moving game elements on the game board, one particular game element (a fish game element) causes a target candy game element to be removed when the fish game element is part of a match. According to the novel feature described above, this could be extended so that it also identifies game elements adjacent to the target candy game element with a similar characteristics as the target game element, alternatively identifying/determining a group of game elements having a characteristic in common with the target game element or to which the target game elements belongs and then removing the group of game elements or the so identified game elements and not just the target game element.

BRIEF DESCRIPTION OF THE DRAWINGS

To understand some embodiments, reference will now be made by way of example only to the accompanying drawings, in which.

DETAILED DESCRIPTION OF SOME EMBODIMENTS

Figure 1:
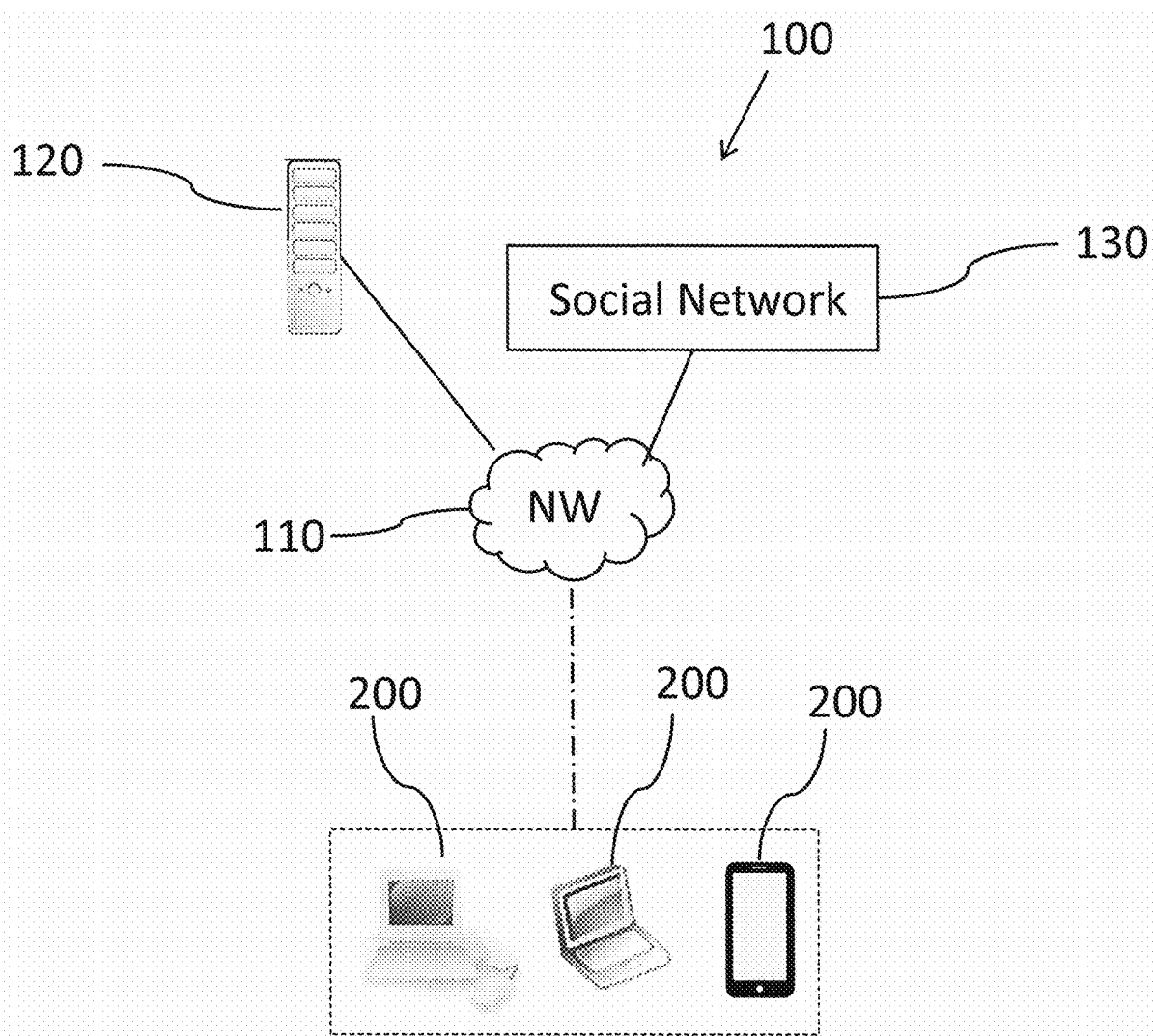
FIG. 1 shows an example user device for engaging with the game.

The techniques described herein can be implemented in for instance a video game such as a 'bubble shooter' game. Such a game provides a static bubble graph in the game board on a display. The object is to remove (pop) bubbles to clear the way through the graph. The game mixes up the bubble popping with explosive bombs and other special bubbles to clear the way to the top faster.

In a typical bubble shooter game the player (or user—the terms are used interchangeably throughout) operates a player object launcher that can shoot player objects into the game board. The game board is typically populated with a number of game objects (e.g. bubbles) already. The game objects are of different types, i.e. they have different object characteristics. The number of different types of game objects may vary between different levels.

The launched player object travels toward the game objects already on the game board on a player-directed trajectory and stick to the objects on the game board. In one embodiment, if the launched player object hits a game object of the same type as the player object and which already has another game object of the same type adjacent to it the three game objects disappear from the game board. This can for instance be done through a popping animation. This is sometimes referred to herein as a '3-match condition'. Other n-match conditions can be created, where n is an integer representing the number of contiguous matching bubbles.

If the launched player objects will cause two other game objects to pop that will leave one game object on the game board with no adjacent game object or a set of game objects that will not have a connection sequence of adjacent game objects to the top of the game board, then the orphaned game object or objects will fall downwards on the game board.

The falling game object can land in receptacles in the lower end of the game board and bounce off game obstacles that are placed on the game board.

The player objects that are launched in to the game board are launched sequentially from a finite number for each game session or level. The player objects resemble the game objects and have a similar range of types. Each launched player object has a type which can be selected randomly, pseudo randomly or based on a set pattern. The player can replace the player object to be launched with another player object, for instance the next player object in a 'launch queue', which is displayed to a player in the game area.

The player object launcher can have a sight line extending in to the game board to aid the player in how the launched player object will travel in to the game board, as directed by the player.

The game can be implemented with the player object launcher in the lower edge of the game board. The launcher can be configured to move right and left along the edge of the game board to allow players to more accurately target and shoot game objects in the static graph.

The game can be implemented so that a level or a game session is completed when all game objects on the game board have been cleared. The player can have a limited time or a limited number of player objects to launch in to the game board or a combination of both.

The player can be awarded for good gameplay. For instance, a score can be awarded each time a launched player object has caused game objects to disappear from the game board following a match condition. The score can contribute to fulfillment of a container objective discussed more fully later. When the container objective is fulfilled, the player is awarded a special game element or booster that can be launched from the player object launcher. This booster clears multiple game objects from the static player graph.

The game level or session ends if the player runs out of time or shots (player objects to launch) before he manages to break through the graph to access the top of the graph.

The player graph has a number of game objects of different types aligned in rows. The game objects on the game board can have 6 (or any other suitable number) of contact points with other game objects. There can be empty spaces on the game board where there are no game objects. There can also be other obstacles on the game board that are not game objects and which cannot be removed.

Game objects can be removed from the game board in three main ways:
- 'Pop' the game object through combining it with two other game objects of matching characteristics;
- Clear game objects above it so that it has no connections to game objects that are connected to the top of the game board. This will cause the game object to fall downwards on the game board and be removed from the game board;
- Blast the game object with an explosion from special game object.

FIG. 1 schematically shows a system 100 which is representative of an architecture in which the game may be provided. The system 100 comprises a server 120 which holds computer code which can be executed to provide the game or downloaded to user devices 200 to implement the game. Server 120 may also have databases of game players' details, profiles, high scores and so on. The server comprises a memory to store the computer game programs and a processor to control delivery of the games programs to user devices. This includes the delivery of different levels, etc. as applicable to individual users.

The server may communicate via for instance the Internet 110 to one or more user devices 200 and may further provide connections to a social network 130 such as Facebook™.

It should be appreciated that embodiments may be deployed in different system architectures. For example, the computer game may be implemented as a computer game that is stored in a memory 220 of the user device 200 and is run on a processor 215 of the user device 200 (see FIG. 2). However, the server 120 may handle some elements of the game in some embodiments. By way of example only, a Java game applet may be provided to the user device 200 and the locally running Java applet will generate, for example, the graphics, sounds and user interaction for the game play on the user device 200. Some data may be fed back to the server 120 to allow interaction with other players. The data which is fed back may also allow scoring and/or cross platform synchronization.

In some embodiments, the game may be implemented as a computer program that is stored in a memory at the server 120, and which runs on a processor of the game server. Data streams or updates are supplied to the user device 200 to allow the user device 200 to render and display graphics and sounds in a browser of the user device 200. Such an approach is sometimes referred to a web service approach. It should be appreciated, however, that such an approach does not necessarily require the use of the Internet.

Figure 2:
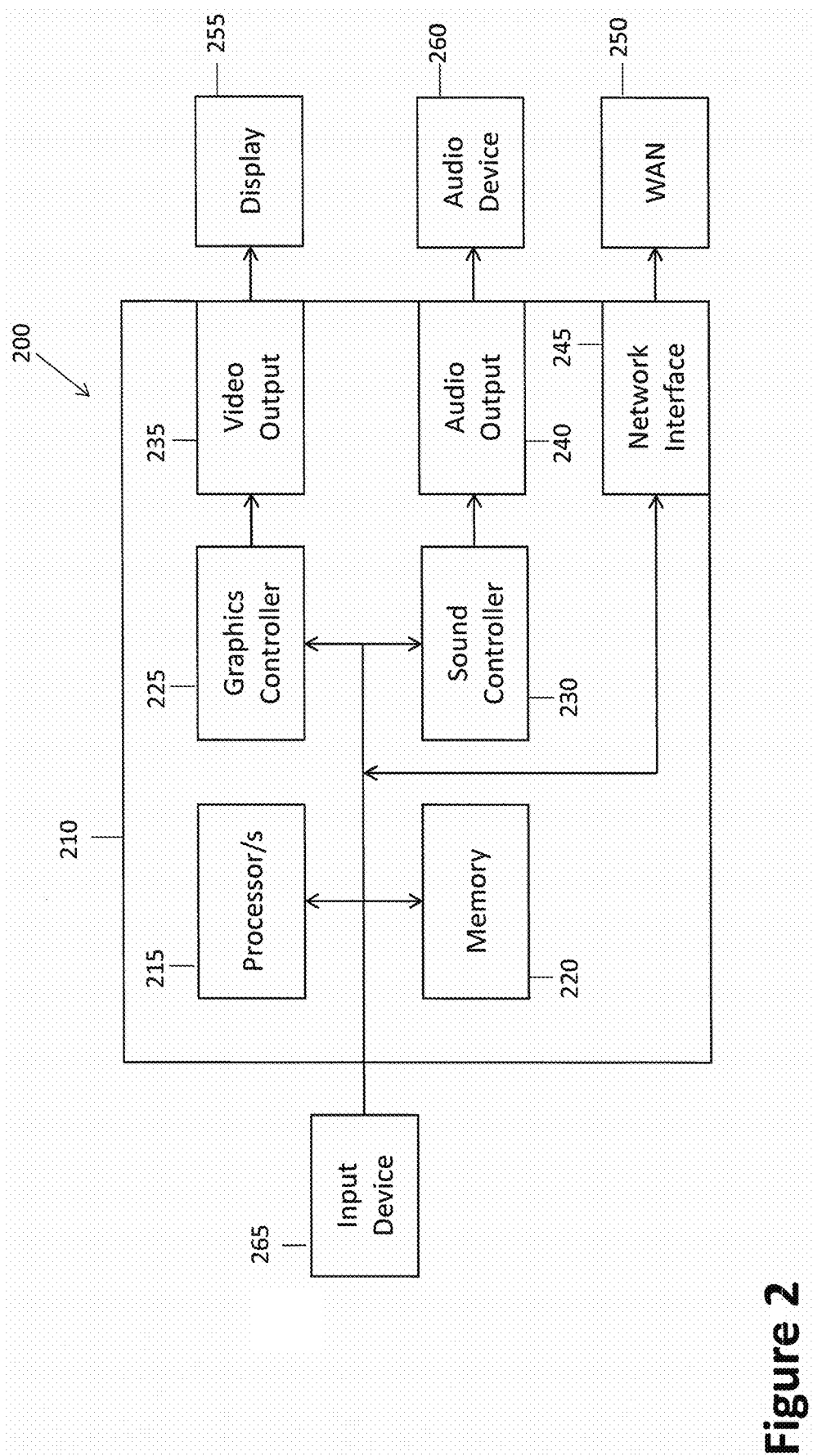
FIG. 2 shows an example user device for engaging with the game.

A schematic view of a user device 200 according to an embodiment is shown in FIG. 2. All of the blocks shown are implemented by suitable circuitry. The blocks may be implemented in hardware and/or software. The user device may have a control part 210. The control part 210 has one or more processors 215 (e.g. hardware or software implemented) and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network 250 such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other by an interconnect such as a bus or any other suitable interconnect and/or by point to point communication.

It should be appreciated that in some embodiments, the controller 210 may be implemented by one or more integrated circuits, at least in part.

Figure 3A:
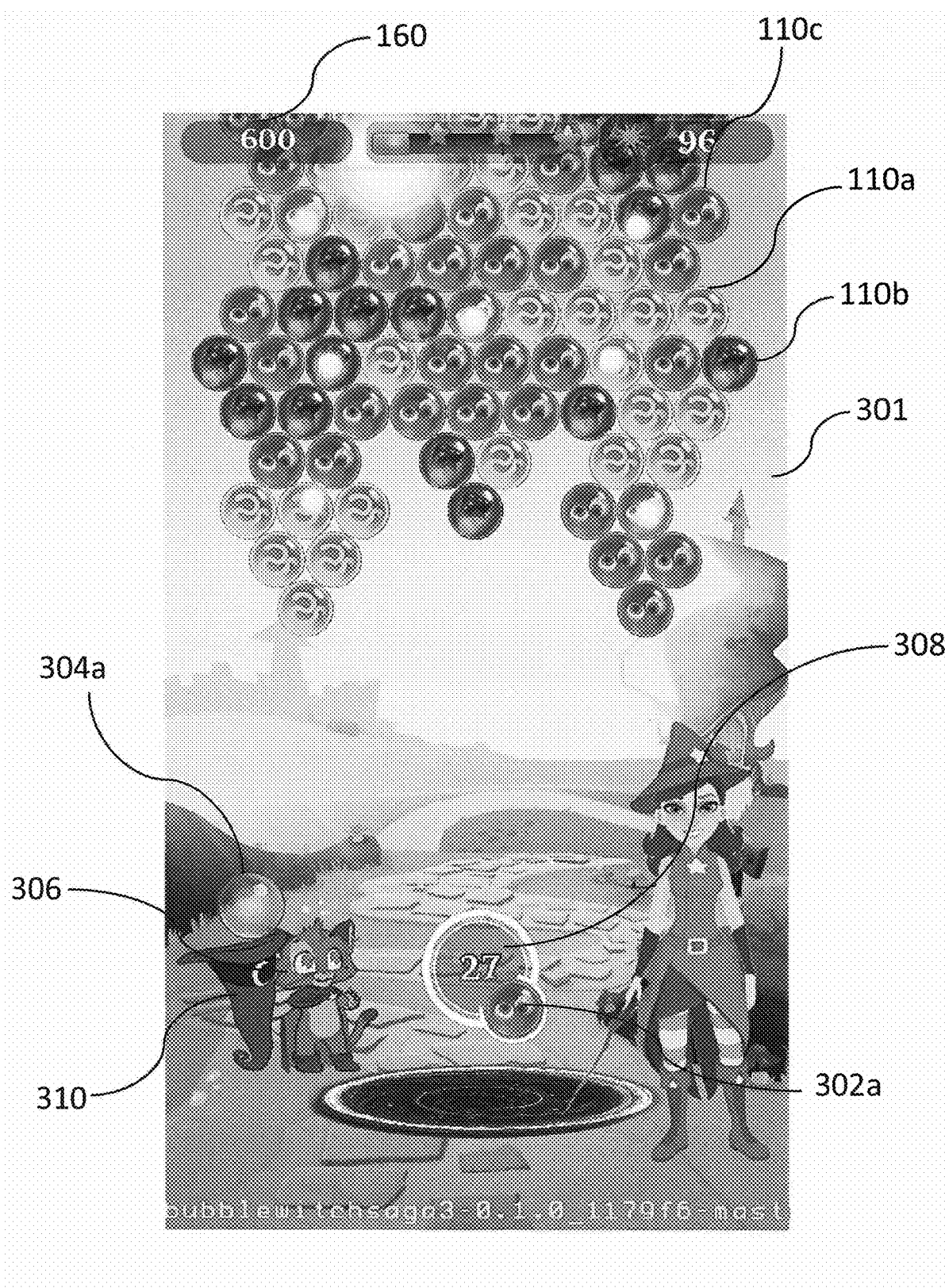
FIGS. 3a to 3e illustrate schematically a game area showing container objective fulfillment.

Reference is made to FIG. 3a which shows an example embodiment of a "bubble shooter"-type computer game such as "Bubble Witch Saga"™. The game has a game area 301 upon which are disposed game objects 110a, 110b, and 110c. The objects may have different object characteristics, e.g. be of different colours or types. There is also provided a player object 302a which may be a projectile for shooting at the game objects depending on the game. A target indicator 412 (FIG. 4a) is provided which may be moved by the player to target game objects 110a, 110b, 110c with the player object or projectile 302a. Typically, the game area 100 will also depict game indicators such as a score 160, a time played, lives and/or turns left 308 and may indicate an in game currency.

In such games, the objective may be to clear the game area 100 of game objects 110a, 110b, and 110c by shooting the player object 302a at the game objects. If the characteristics of the game object 110a and the player object 302a match (such as colour or any other suitable criteria) then the game object 110a is eliminated. In some embodiments, there may be a requirement for the player object to match two or more adjacent game objects for the game objects to be eliminated.

Two novel game features are discussed herein. Firstly, an objective for which a player can directly select a player object to make an active contribution towards. This is referred to herein as a container objective because in the present example, a container (a cat's hat) is illustrated. However the concept of direct contribution to an objective by selecting a player object, which is then deselected from targeting the player graph, is more widely applicable.

Container Objective

FIGS. 3a-3e illustrate a container with a container objective and a series of steps that may be completed by a user, in order to achieve the container objective.

In FIG. 3a, a cat character 306 is shown holding an upturned hat, herein referred to as a 'container' 310. The container 310 is associated with a container objective, the completion of which results in a special type of player object being made available to the player (described later). The status of the container objective is indicated by a container objective indicator 304a, which, in the present example is located above container 310. The transparency of the container objective indicator 304a provides an indication as to how close a user is to achieving the container objective. In the present example, container objective indicator 304a appears as a bubble having a uniform transparency and a relatively high transparency value, thereby indicating that the user has not yet contributed to the completion (in full or in part) of the container objective. In FIG. 3a, a current player object is indicated at 302a and game indicator 308 indicates that a user has 27 player objects at their disposal. These player objects are held in a queue ready for release into the game area.

Figure 3B:
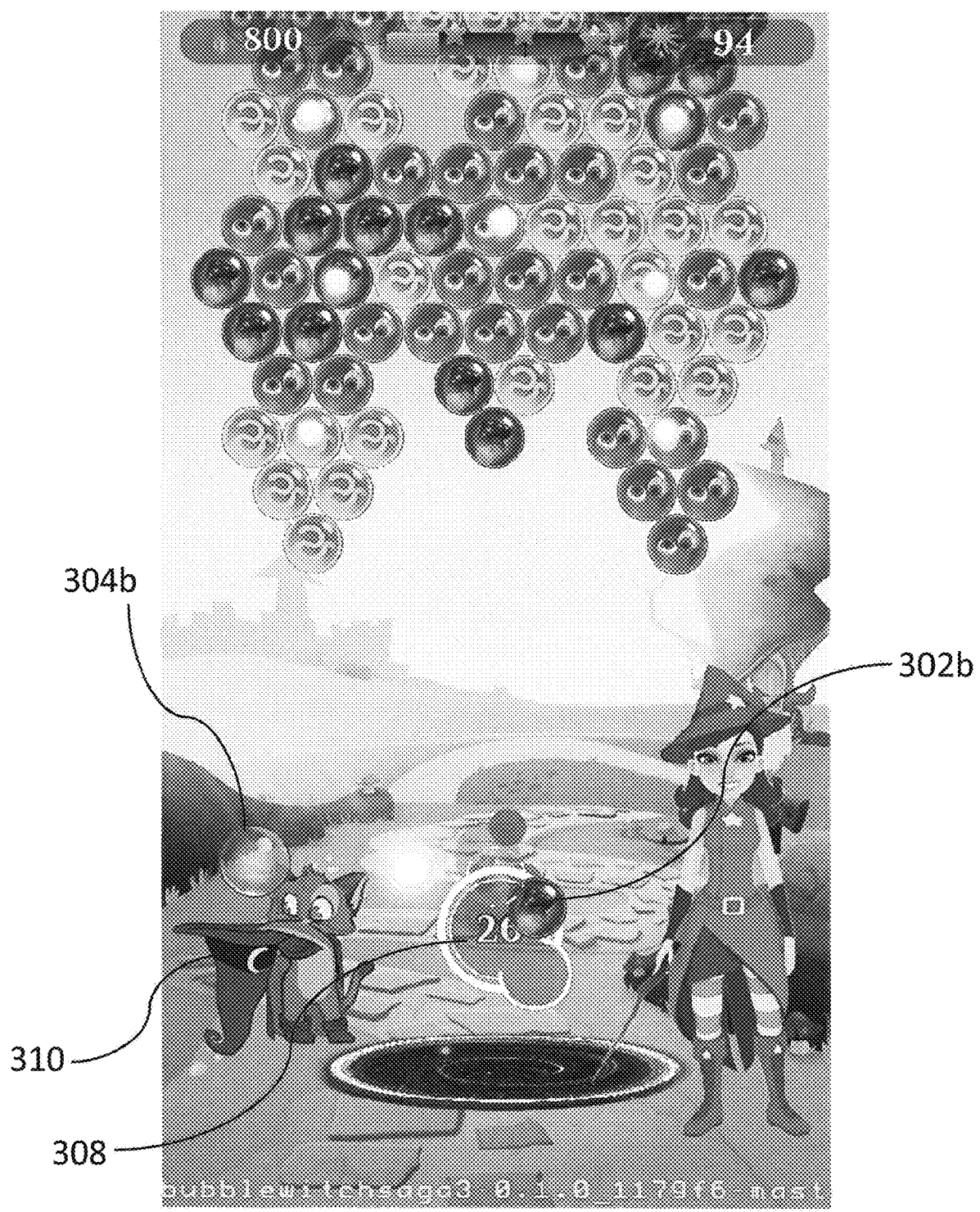

One way in which a user may contribute to the completion of the container objective is by selecting container objective indicator 304a (i.e. via a user input). On a touch screen interface, the user touches the indicator 304a but other selection mechanisms such as a mouse or keyboard operated cursor are possible. This results in the current player object, e.g. player object 302a, travelling along a trajectory into container 310. The container objective indicator 304a may then be updated (e.g. partially shaded) so as to reflect that a player object has been put into the container 310. This is shown in FIG. 3b, where, the transparency of container objective indicator has been updated such that a portion of it is of a different opacity (e.g. less transparent) to the remaining portion. This updated container objective indicator is shown at 304b.

When a player object is selected to directly contribute to the objective, it is deselected from shooting game objects in the graph, and is removed from the queue, e.g. "waiting" player objects.

A user may opt to put a player object into container 310 if he or she feels that the current player object, e.g. 302a, cannot be used to create a match, or, that a better match could be created by using a different player object. However, there is a risk associated with this, as in doing so, the user is limiting the number of player objects (and in turn, number of moves) that the user can use to complete the level. The user can only ever see what the next player object will be, and thus can only ever look one move ahead in determining whether to put the current player object in container 310.

The portion of the container objective indicator 304b that is of a different opacity provides an indication to the user of how close the user is to achieving the container objective (i.e. how close the user is to filling the container). Having put player object 302a into the container, a new player object 302b is then made available to the user, assuming the finite number of player objects has not been reached. The game indicator is decremented by one (e.g. from 27 to 26) so as to indicate that player object 302a has been put into container 310.

Figure 3C:
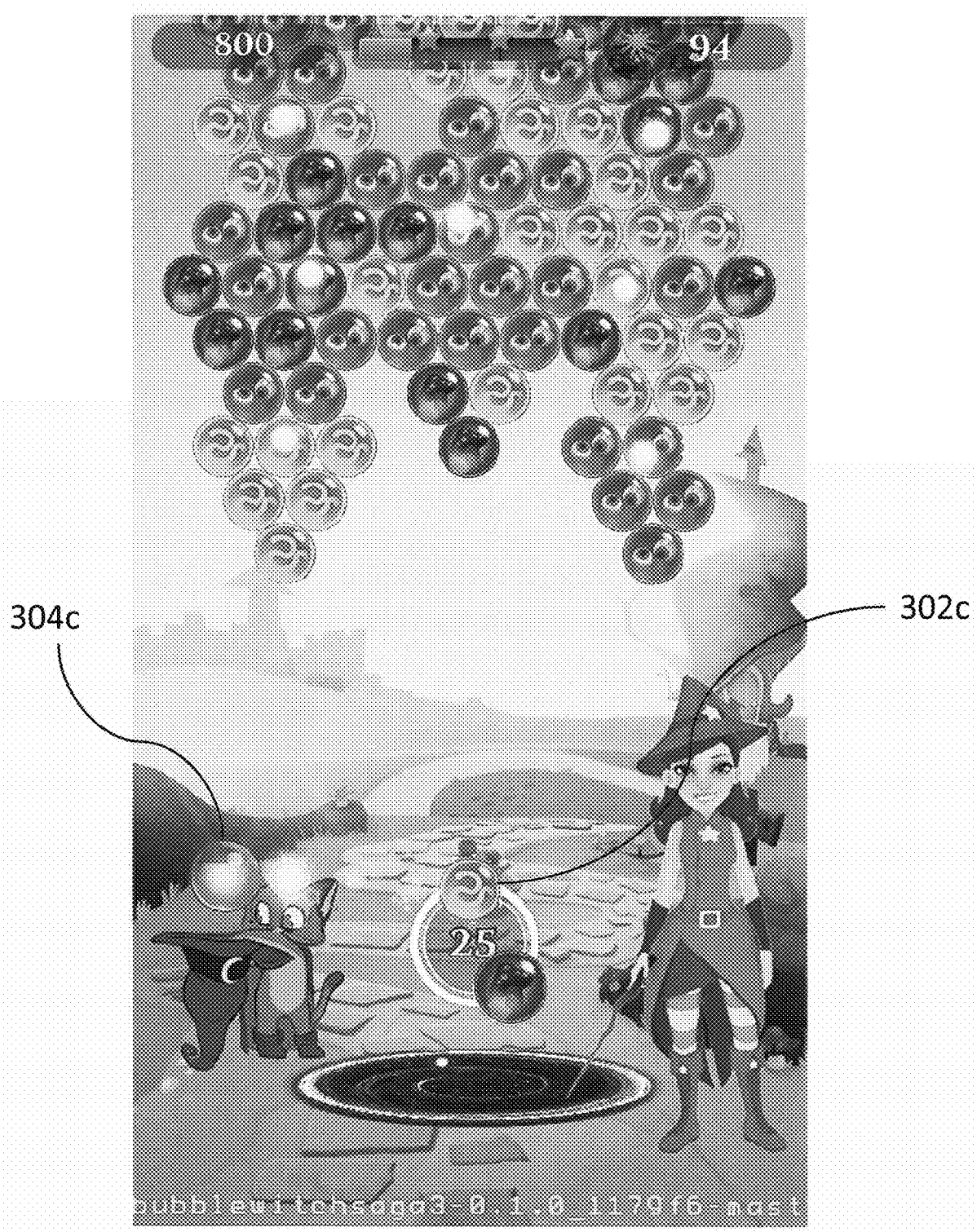

A user may then select container objective indicator 304b, thus resulting in player object 302b being put into container 310. As a result of the user selecting the container objective indicator a second time, the container objective indicator 304b may then be updated such that a larger portion of it is of a different opacity to the opacity of the remaining portion (i.e. a larger portion of it is of a different opacity, relative to the original transparency of the container object indicator). This is shown in FIG. 3c by container objective indicator 304c. Since a larger portion of the container objective indicator is of a different transparency a user can infer that they are closer to completing the container objective (i.e. filling the container). Other ways of indicating the level of fulfillment to the objective can be utilised (e.g. different colours or bars). As before, putting player object 304b into container 10 has resulted in a new player object 302c being made available to the user. The game indicator 308 has also been decremented by one (e.g. from 26 to 25) to indicate that player object 302b has been put into container 310.

Figure 3D:
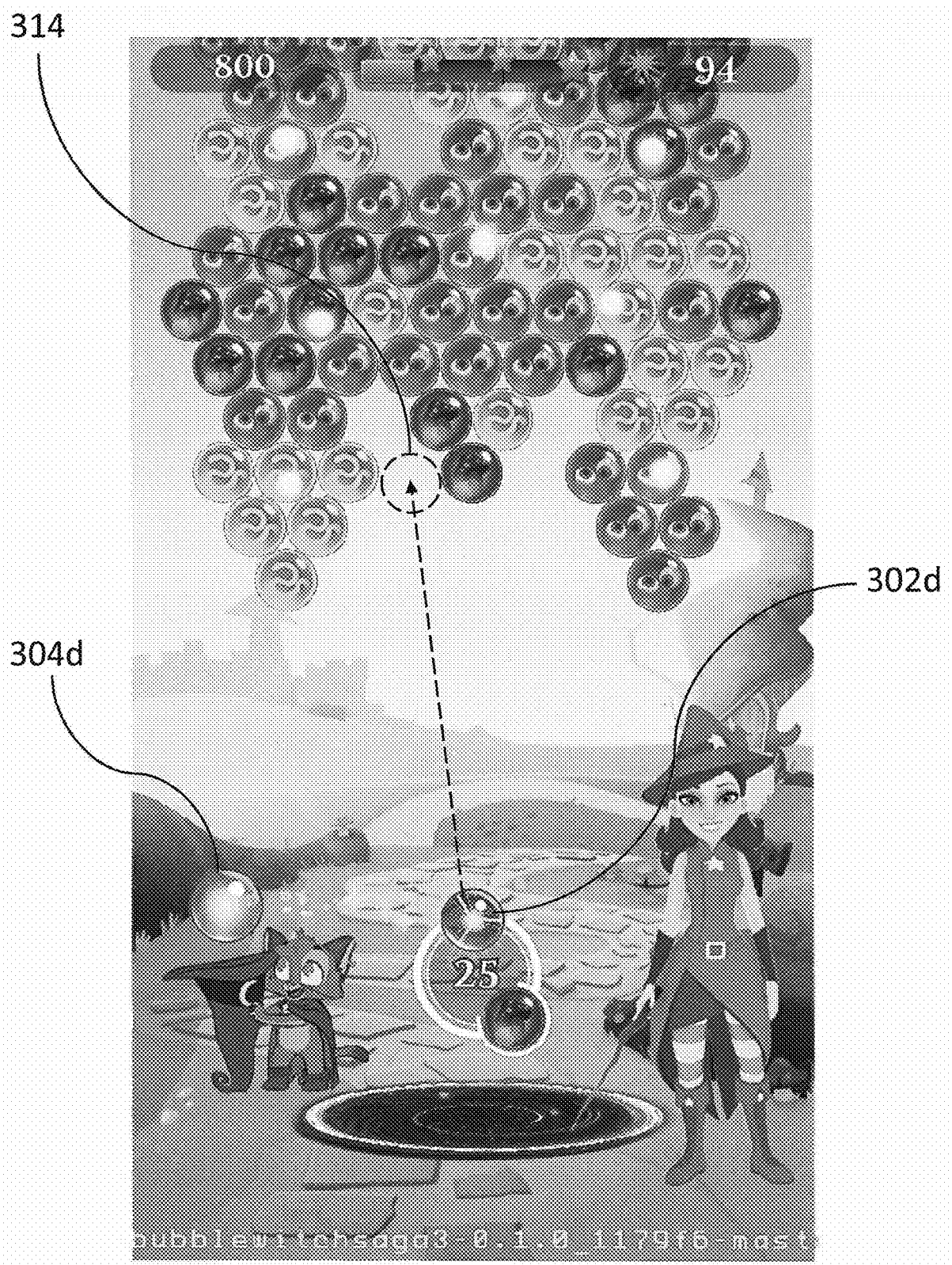

A user may then select container objective indicator 304c a third time, thus resulting in player object 302c being put into container 310. As a result of the user selecting the container objective indicator a third time, the container objective indicator 304c may then be updated again such that an even larger portion of the container objective indicator is of a different opacity. In one embodiment, the container objective may comprise filling the container 310 with three player objects. This particular embodiment is shown in FIG. 3d, where selecting the container objective indicator 304c a third time has resulted in the completion of the container objective. As can be seen in FIG. 3d, the container objective indicator has been updated so as to be of a uniform but higher opacity (i.e. the entire indicator is of the different opacity). This is shown as container objective indicator 304d. The completion of the container objective has also resulted in a new special player object 302d being made available to the user. The special player object 302d is 'new' in the sense that it is provided to the user in addition to the player objects that are already at the user's disposal (hence, in FIG. 3d, game indicator 308 has not been decremented by one, it remains at 25).

Figure 3E:

The effect of the special player object 302d on the game objects in the game area is illustrated in FIG. 3e. As can be seen in FIG. 3e, the collision of the special player object with the game objects in the game area has resulted in a greater number of game objects being removed from the game area than would otherwise be the case for a conventional 3-match condition. In some embodiments, the special player object 302d may remove game objects from the game area such that two or more game objects are removed in every direction, relative to the position at which the special player object first collides with a game object (e.g. position 314 in FIG. 3d).

It should be noted that selecting the container objective indicator is not the only way in which a user may complete a container objective. In some embodiments, a user may also remove game objects from the game area in the conventional way (i.e. by creating matches), and in doing so, may cause the container objective indicator to be 'filled in' (i.e. become less transparent). For example, each match created by the player may be associated with a score, where the score depends on the number of game objects involved in the match, and this score may determine the extent to which the container objective indicator is 'filled in'. For example, the container objective indicator may be filled in more quickly by a user creating 4- or 5-matches than by creating 3-matches (since 4- or 5-matches are associated with a higher score than 3-matches). "Passive" contributions made in this way may have a lower weighting than "active" (direct) contributions. The container objective indicator may be associated with a score threshold and the container objective may be achieved by creating a number of matches that cumulatively correspond to this score threshold, cumulatively with any active contributions suitably weighted. As in the embodiments described above, completing the container objective may result in a special type of player object being made available to the user (such as special player object 302*d* shown in FIG. 3*e*).

The second novel game feature relates to releasable icons (illustrated herein or fairies) which, when released can travel to a different game object.

Releasable Icons

Figure 4A:
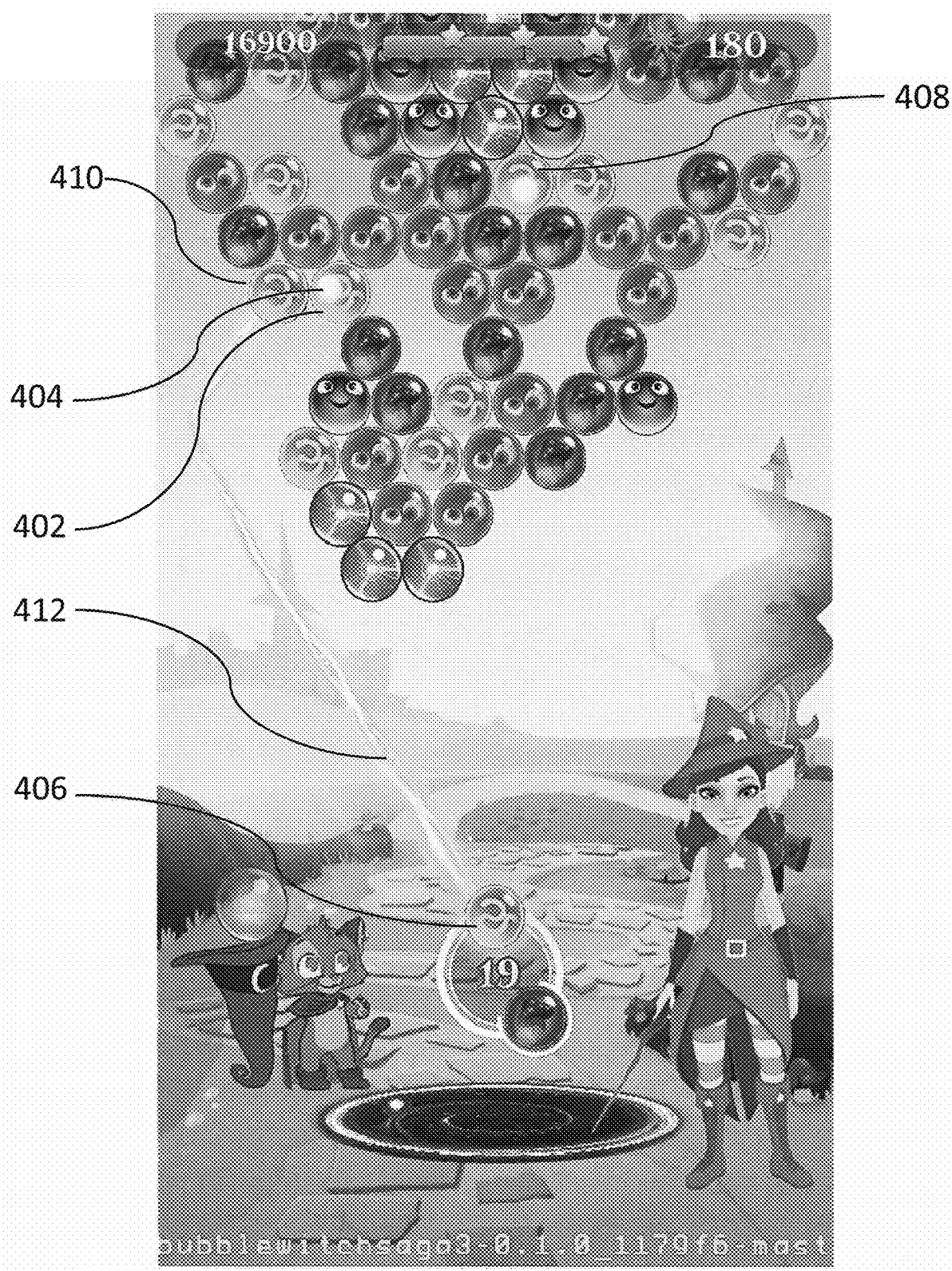
FIGS. 4a to 4c illustrate a game area with a releasable icon.
Figure 4B:
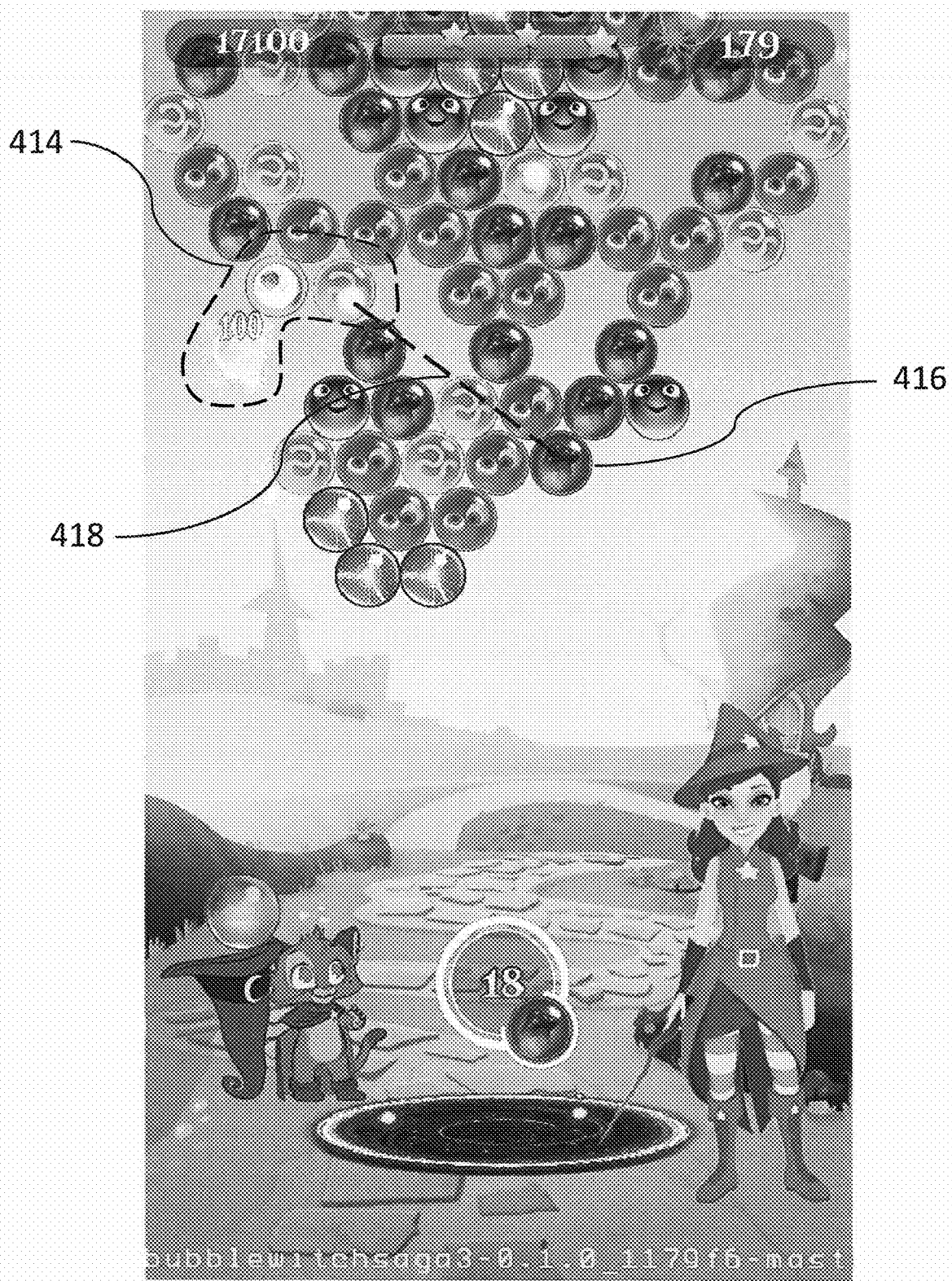
Figure 4C:
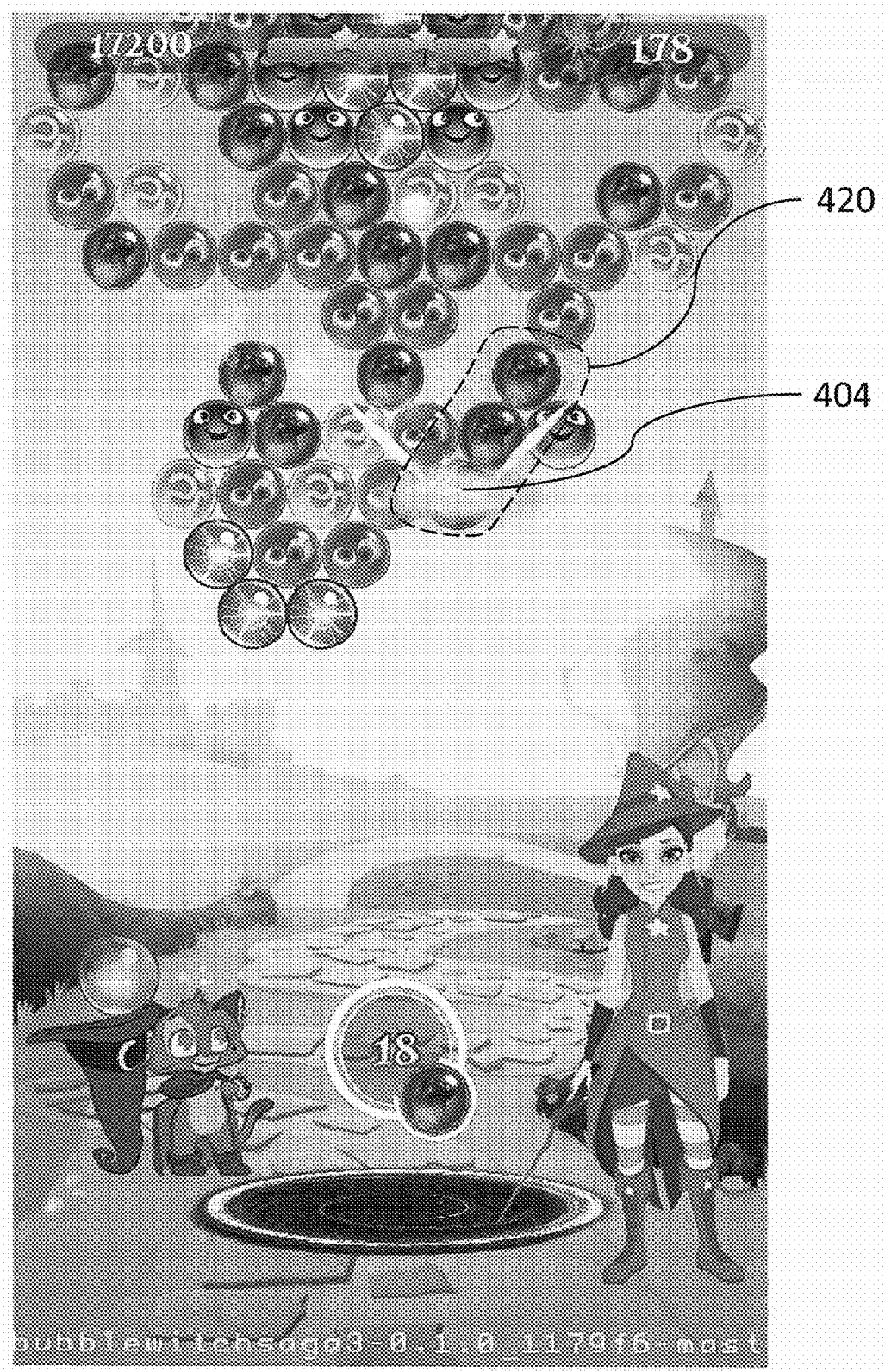

FIGS. 4*a*-4*c* illustrate a game level that includes releasable icons.

FIG. 4*a* illustrates a game level in which two game objects (402 and 408) are associated with releasable icons. In the level shown by FIG. 4*a*, game object 402 is associated with releasable icon 404, which may be, for example, depicted as a fairy. A user may release the fairy by creating a match with their current player object and two or more game objects, where at least one of the two or more game objects contains a fairy.

FIG. 4*a* shows that a user is about to create a 3-match between three game objects, by aiming player object 406 towards game object 410 (as indicated by target indicator 412).

FIG. 4*b* shows the creation of that 3-match (outlined at 414), as a result of the user firing player object 406 at game object 410. The creation of this 3-match has resulted in the release of the releasable icon 404 at game object 402, which, as mentioned above, is depicted as a fairy. Arrow 418 indicates the path to be taken by the released fairy, shown in FIG. 4*b*. In FIG. 4*b*, the fairy is about to travel.

As can be seen in FIG. 4*c* the released fairy has traveled to a new location in the game area, at game object 416. Game object 416 is part of a 3-match—the two game objects adjacent to it are of the same type (e.g. colour). As a result of the fairy targeting this group of game objects, the matched objects (as outlined at 420 of FIG. 4*c* are removed from the game area and the fairy is released. That is, the fairy is no longer visible to the user. It should be noted that the initial release of the fairy, its subsequent movement to a new game object and the removal of the group of matching game objects has all occurred as a result of the user firing player object 406 at player object 410. That is, the series of events described in relation to FIGS. 4*a*-4*c* all occur without player input, before the player makes their next move, with their next player object.

While in the embodiments described above, the releasable icon has been shown to move to a group of matching game objects, this may not always be the case. In some embodiments the releasable icon may move to a single game object that may or may not be part of a match. Selection of the destination of the fairy may be random or based on the actions or performance of the user.

For example, in one approach, the method identifies how many groups of bubbles are visible in the graph.

A group can contain one or more bubbles of the same characteristic, and in a group each bubble touches at least one other bubble.

A group of one specific characteristic is never next to a bubble of the same colour (this bubble should be considered part of the group, instead).

Every coloured bubble belongs to one (and only one) group.

"Special" bubbles do not belong to a group and therefore are not a valid target for fairies.

When the fairy is released one of the visible groups is randomly selected. For the selected target group, a specific target bubble is selected randomly. When the fairy reaches this bubble it starts an explosion that affects all bubbles of the chosen group. If the chosen group was actually an individual bubble (surrounded by bubbles of different colours) the fairy just removes this bubble from the graph.

In an alternative example, the selection of a bubble for the fairy can be randomized on a game object basis and then adjacent bubbles sharing a characteristic can be determined/identified as being in a group to be removed.

In the two tier approach, where a group is selected, and then a bubble is selected, there is less likelihood of bubbles forming part of a larger match-n group being targeted by a fairy and removed. Such larger groups are easier for a player to remove, so the fairies are carefully targeted at less easy groups, by the two tier approach.

In another example, the movement of the releasable icon may depend on the match that was created by the user in releasing the fairy. For example, the releasable icon may reward higher matches by moving to a game object that causes the removal of a greater number of game objects from the game area.

Figure 5A:
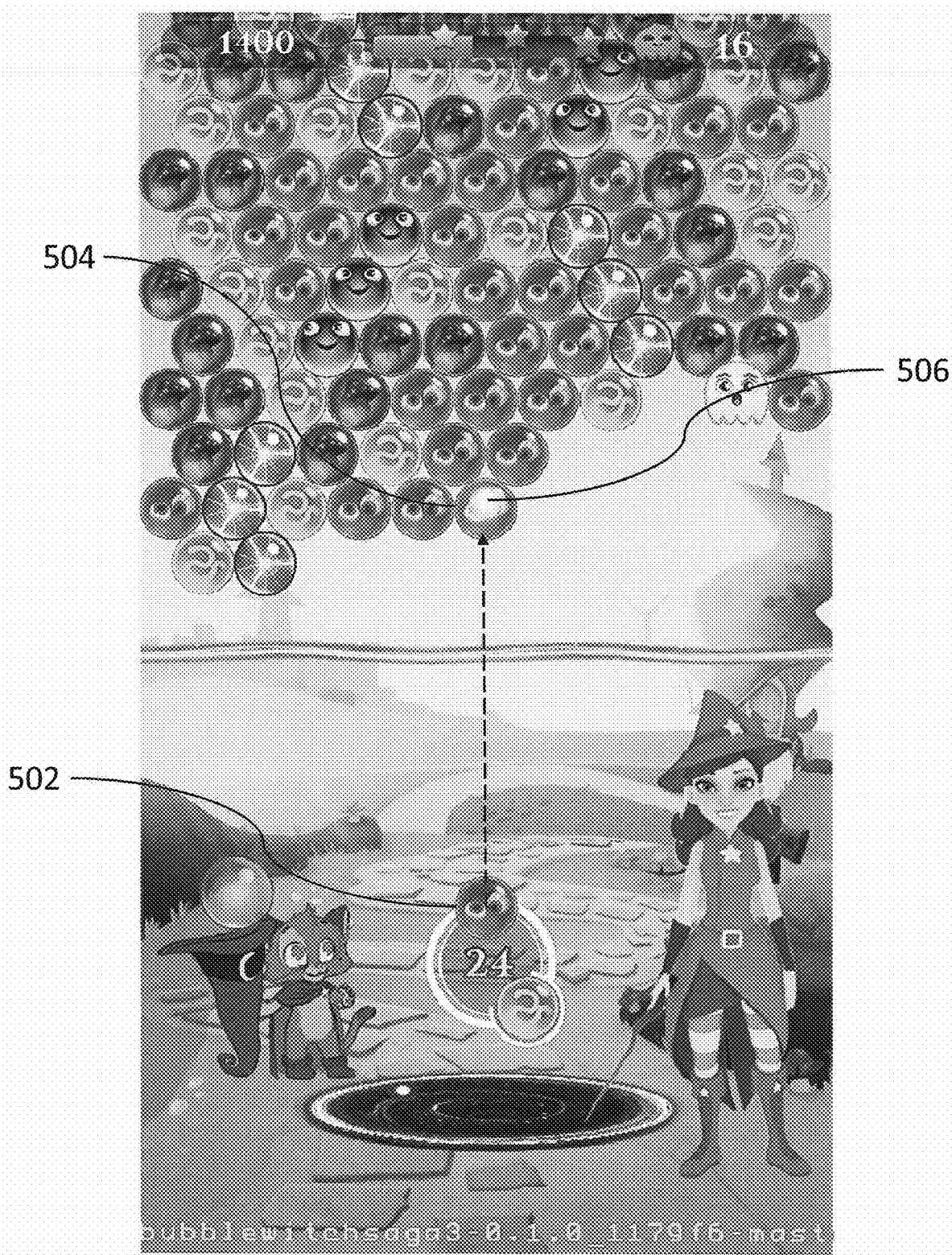
FIGS. 5a to 5c illustrate a game area with a releasable icon travelling to a lone bubble.
Figure 5B:
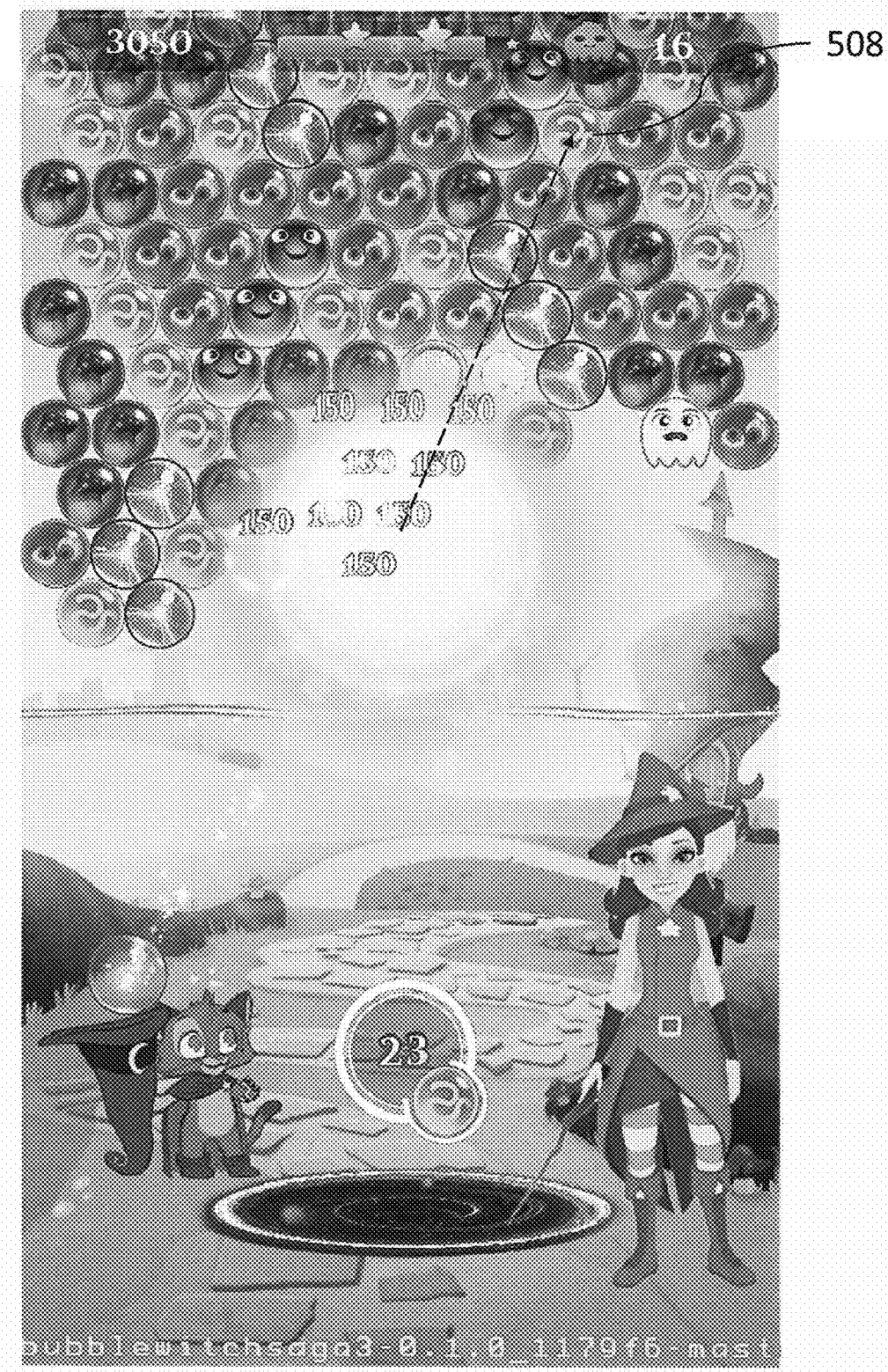
Figure 5C:
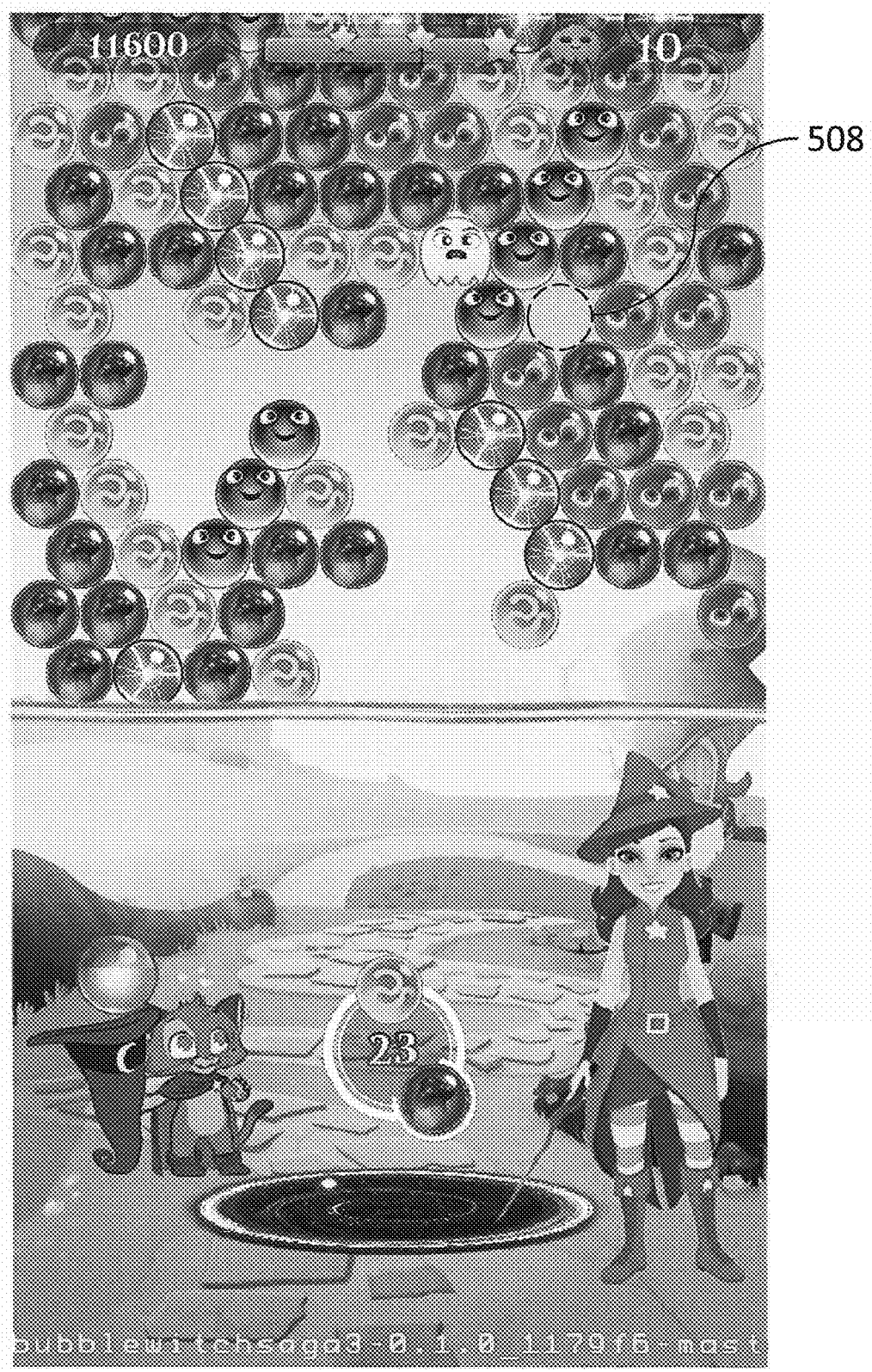

FIGS. 5*a*-5*c* illustrate the movement of a releasable icon to a new game object, where the new game object does not form part of a match with any other game objects. That is, the game object that the releasable icon moves to, is not adjacent to two or more game objects of the same type. As can be seen in FIGS. 5*a* and 5*c*, by firing player object 502 at game object 504, a match-23 has been created by a user, resulting in a score increase of +10,200. This, in turn has resulted in releasable icon 504 moving from game object 504 to game object 508, and removing game object 508 from the game area. As noted above, game object 508 may be selected randomly through the two tier approach or otherwise.

Figure 6:
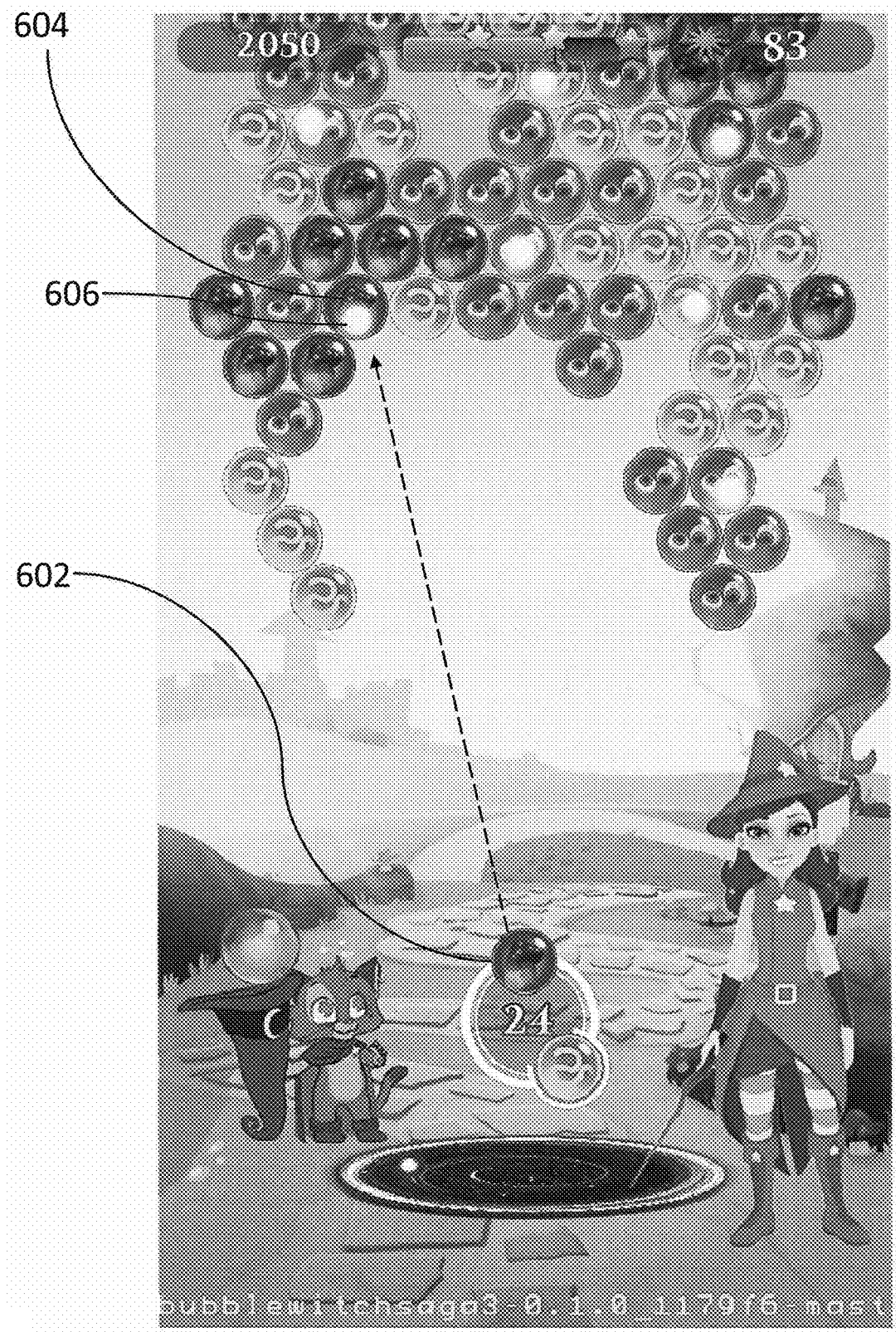
FIG. 6 illustrates a game area with a released icon targeting an 8-match group.

As can be seen in FIG. 6, a user can create an 8-match by firing player object 602 at game object 604. Game object 604 is associated with releasable icon 606.

Upon creating the match, the game objects that form the 8-match are removed from the game area and the fairy is released from game object 603 to travel to a new game object.

Figure 7A:
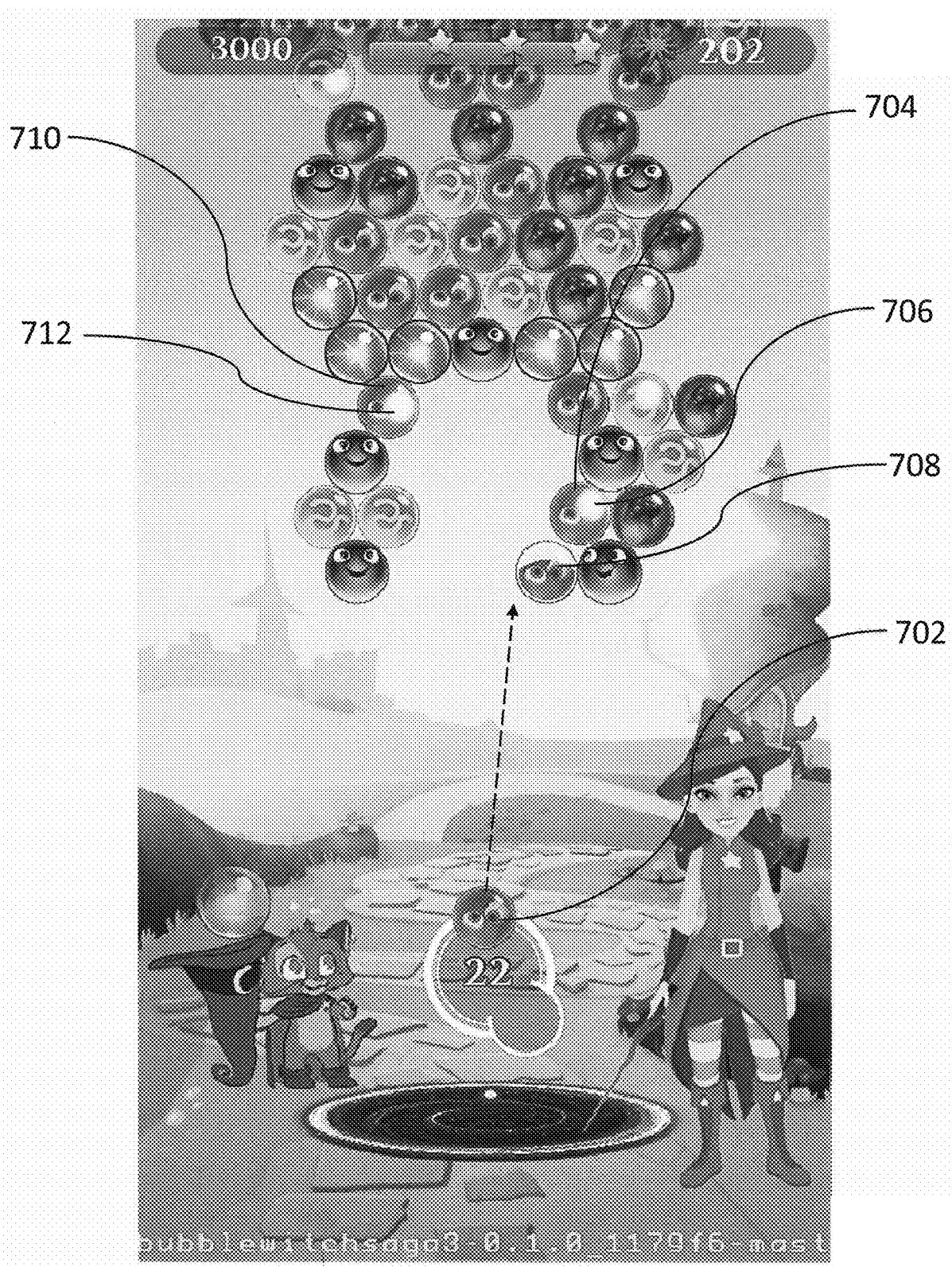
FIGS. 7a to 7c illustrate a game area with releasable icons being removed from the game area.
Figure 7B:
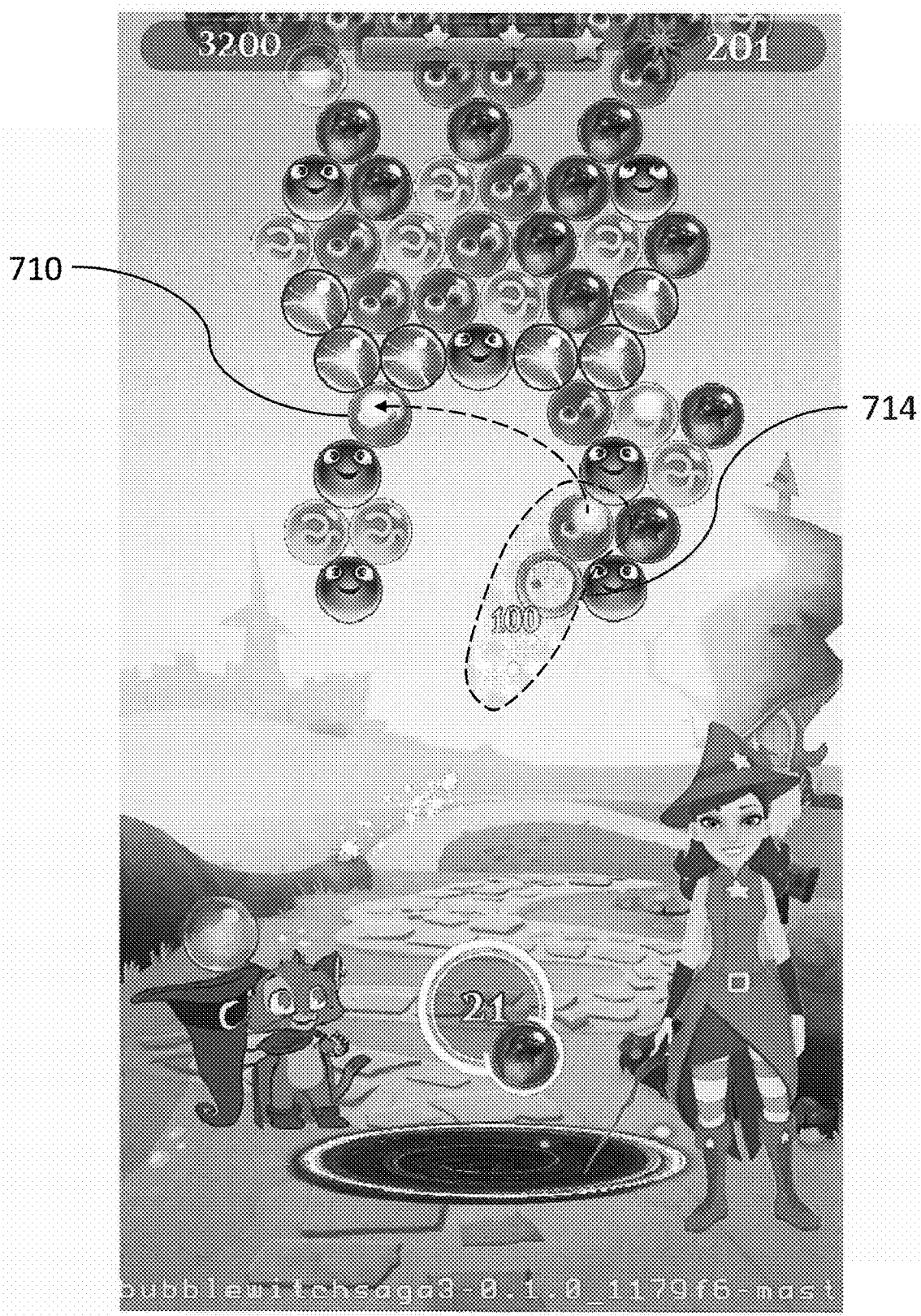
Figure 7C:
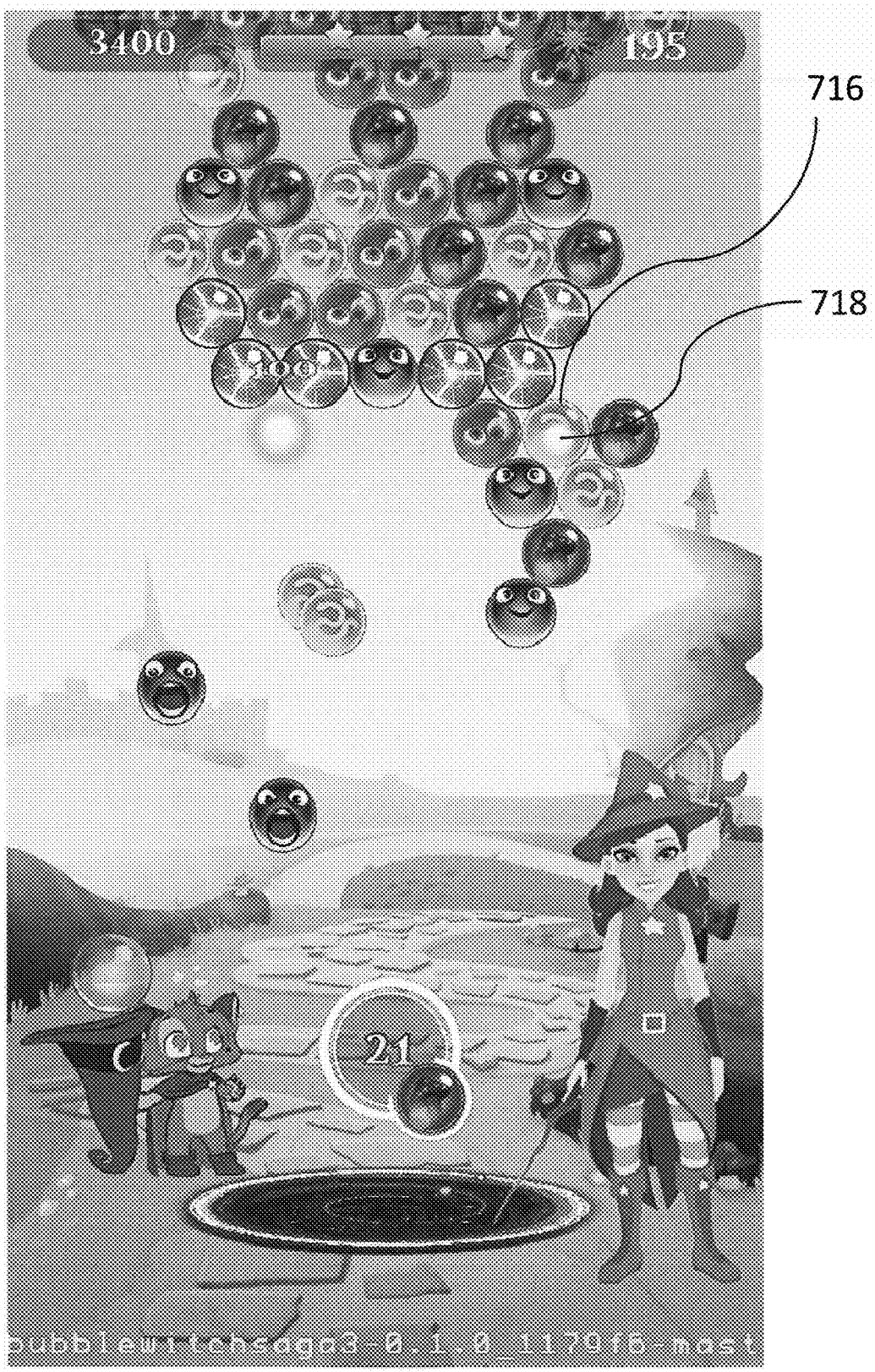

FIGS. 7*a*-7*c* illustrate an example embodiment in which a first releasable icon is released, moves to another game object containing a second releasable icon, wherein the second releasable icon is released in a chain reaction. A chain reaction is one in which a next event is caused to happen without user input, in this case release of a second fairy. This chain reaction is a cascading effect. Cascading effects can be hard to achieve in bubble shooter type games, but are attractive to players and can increase player retention by providing more rewarding positive feedback as, in this case one fairy triggers another fairy, which triggers another fairy and so on.

As can be seen in FIG. 7*a*, game object 704 is associated with releasable icon 706. As can also be seen in FIG. 7*a*, game object 710 is also associated with a releasable icon, releasable icon 712. Both releasable icons may be depicted as fairies. A user can create a match-3 by firing player object 702 at the game object 708.

FIG. 7*b* shows the creation of the match-3 formed by colliding player object 702 with game object 708. Upon creating the match-3 (as indicated at 714), the group of three matching game objects are removed from the game area and the releasable icon 706 is released from game object 704. The releasable icon 706 travels to a new position of the game area, targeting game object 710, which has been selected e.g. by the two tier randomised approach. Game object 710 is a group of one in this case.

FIG. 7c shows the consequential removal of single game object 710, as a result of releasable icon 706 moving from game object 704 to game object 710.

The fairy 712 is released from the targeted game object 710. Note that in this embodiment the fairy is released when the selected group is removed whether the fairy is in the targeted bubble or in a matching bubble in the same group as the targeted bubble.

The release of releasable icon 712 may cause releasable icon 712 to move to another group of game objects and cause the removal of that group of game object and any other neighbouring game objects of the same type from the game area. If releasable icon 712 moves to another game object containing another fairy (such as game object 716 shown in FIG. 7c) it causes in a continuation of the chain reaction, the release of a third releasable icon (such as releasable icon 718).

In other embodiments, releasable icon 712 may be removed from the visible game area (i.e. releasable icon 712 does not move to another game object before being removed from the game area).

Thus, the chain reaction can involve any number of releasable icons being released.

In all embodiments, if the releasable icon does move to a different game object on the game area, the releasable icon will cause at least that game object to be removed from the game area. In some embodiments, the group of matching game objects containing that game object is removed in its entirety, releasing any releasable icons in game objects of the removed group.

Figure 8:
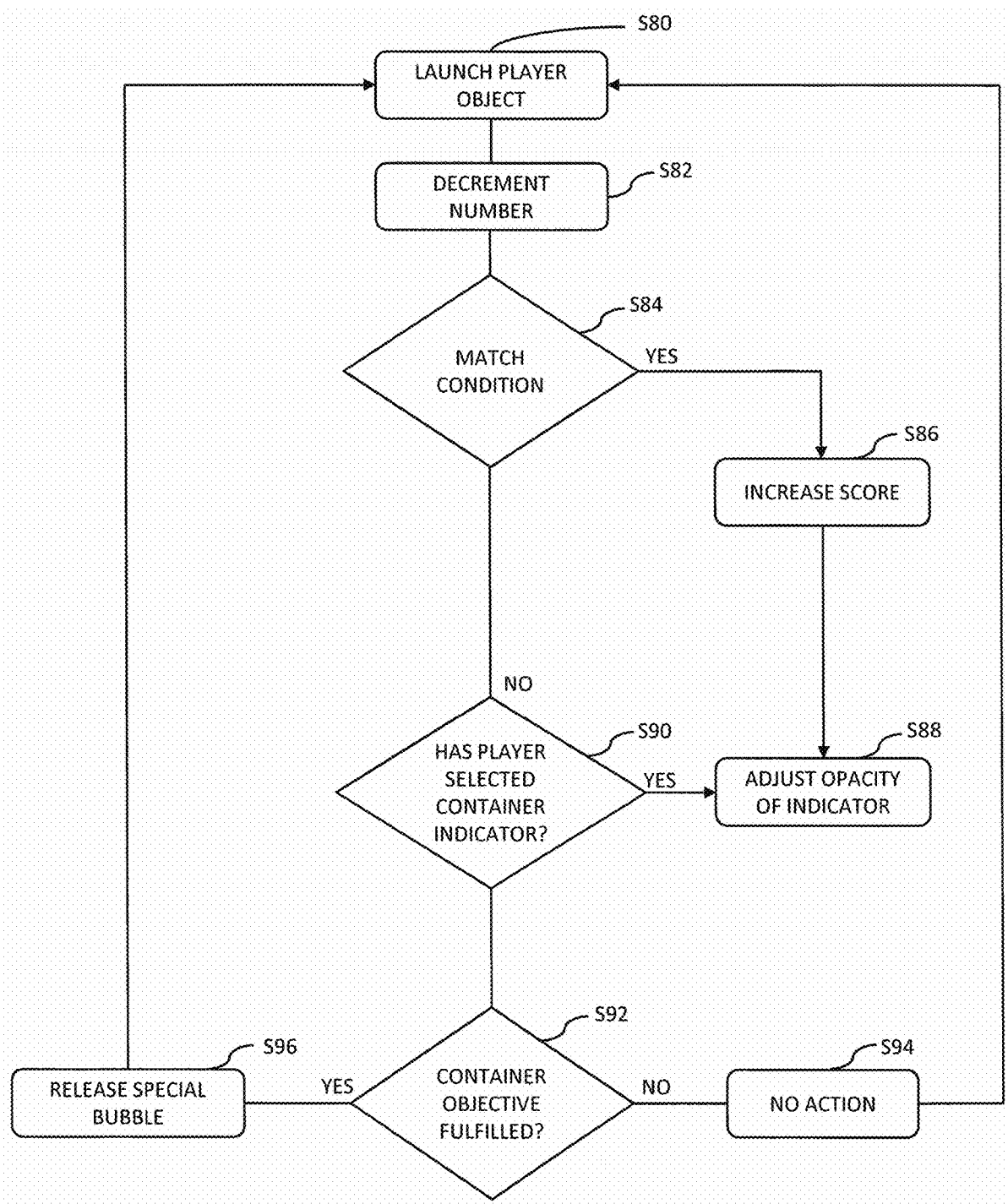
FIG. 8 is a flowchart illustrating steps in a method of container objective fulfillment.

FIG. 8 is a flowchart illustrating operation of the game code to deliver the feature described with respect to FIGS. 3a to 3e. The process starts at step S80 when a player object is launched. At Step S82, the number is decremented at step S82, and the remaining number of player objects is visually indicated to the player. At step S84 it is determined whether or not there is a match condition. That is, whether the launch player object has hit a game object which already has one or more matching game objects adjacent to it, or in an adjacent sequence or set. If it has, the player score is increased at step S86 and the opacity of the container objective indicator is altered at step S88.

As already mentioned, there may be a situation that a player can get to in some static player graphs, whereby launching a player object they can see that they are not going to be able to make a match condition, or not be able to make a match condition which is going to contribute significantly to their score or to the overall objective of clearing the bubbles from the player graph before their session or level expires. In that case, they may choose, rather than launching the player object at the player graph, to select the container indicator. The process detects at step S90 whether or not the player has selected the container indicator. If he has, the process moves again to Step S88 where the opacity of the indicator is adjusted to reflect the fact that a player object has been "added to" the container. The process moves to Step S92, where it is detected whether or not the container objective is fulfilled. If it has not been fulfilled, no action is taken and the process returns to launch the next player object at Step S80. If the container objective has been fulfilled, a special bubble is released at step S96 and then the process moves to launch the next player object at Step S80. Note that the next player object is only launched if there is one left to be launched. That is, there is a continual monitoring after each time a player object has been launched as to whether or not the finite number of player objects for this level or session has been reached. If it has, the level or session is terminated.

The process moves to Step S92 where it is determined whether or not the container objective is fulfilled.

Figure 9:
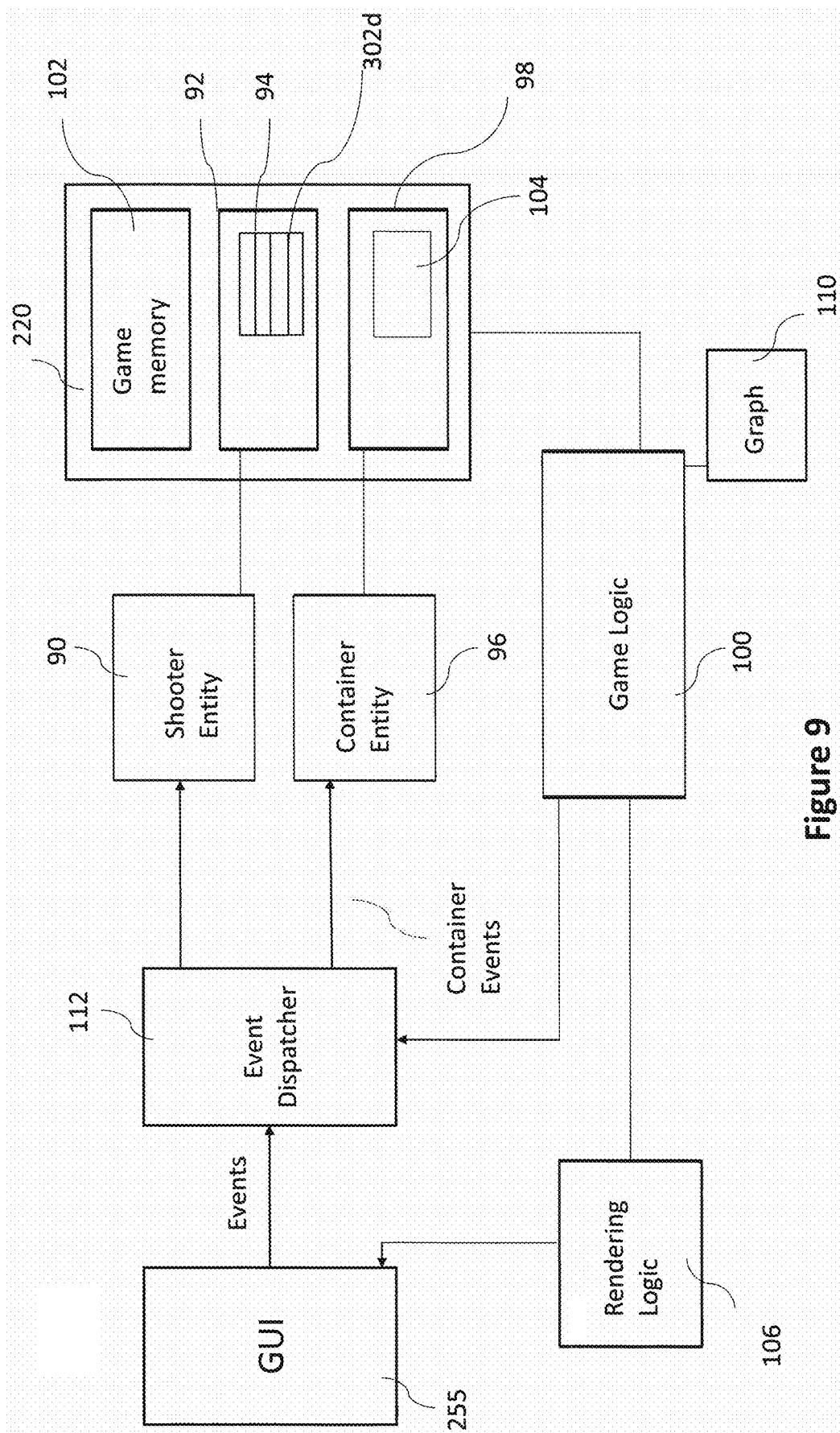
FIG. 9 is a schematic block diagram of the computer infrastructure according to one embodiment.

FIG. 9 is a schematic block diagram of software modules and memory architecture for delivering the container objective. A shooter entity 90 manages the shooting of player objects at the game graph. The shooter entity accesses a portion of the memories 220 which is referred to herein as a shooter memory 92. The queue of player objects is held in the shooter memory and is denoted by reference 94.

The container is managed by a container entity 96 which has access to container memory 98 which may also form part of the memories 220.

Game Logic 100 can be executed by the processor 215 and has access to a game memory portion 102. The container entity 96 and the shooter entity 90 can communicate via the Game Logic 100. Note that connections are not shown in FIG. 9, for reasons of clarity. It will be appreciated that the shooter entity, container entity, event dispatcher and Game Logic 100 are implemented as software modules executing in the processor 215. The container memory 98 stores a variable 104 managed by the container entity 96. This variable 104 corresponds to the container indicator and is updated when a passive or active contribution is made to the container. The container entity 96 detects events of the game in order to detect when a passive or active contribution has been made, and then adjusts the variable 104 accordingly. Rendering Logic 106 associated with the Game Logic 100 is used to control the images which are rendered on the screen responsive to the updating of the variable 104, for example changing the opacity of the indicator of the container object on the screen. When the variable 104 in the container memory 98 indicates that the container objective has been satisfied, this is communicated by the Game Logic to the shooter entity 90 which then inserts into the queue 94 a special player object 302d, in the form of a bubble object having a special behaviour. As explained later with reference to FIG. 10, the special behaviour is embodied in a table of reactions associated with the bubble object. The bubble object can receive events from an event dispatcher 112. When a special bubble which is launched towards the graph 110 collides with the graph a collision event is received at the bubble which causes an explosion of the graph for the immediately surrounding bubbles and the next layer of surrounding bubbles (referred to as a radius 2 event) to be rendered by the Rendering Logic 106.

Game entities notify events through the event dispatcher 112 to all entities registered to receive that type of event, e.g. bubble objects. However, there are entities like the shooter entity 90 which can access bubble objects.

Bubbles subscribing to events from the event dispatcher 112 are determined based on their position in the graph. Each bubble has a bubble ID which indicates its position in the graph 110. When a special bubble object receives a collision event, the table of reactions causes the immediately surrounding bubbles and the bubbles adjacent to the immediately surrounding bubbles to be exploded through the operation of the event dispatcher. An explosion is implemented by the Rendering Logic 106 causing a visual animation to appear on the display in which the bubbles explode and are removed. The graph 110 is updated to reflect the modified graph after the explosion.

According to another feature, the container is disabled while the player object is being shot, to prevent a user from putting game objects into the container. When the container is disabled, event dispatcher 112 which receives events from the interface continues to receive events such as container events but discards them and does not pass them to the container entity 96. Note that the event manager 112 also handles shooting events from the interface, although only the container events are shown in FIG. 9. The container entity 96 is disabled until a stable state of a graph has been reached after a previous game play, and is then re-enabled by the Game Logic 100.

The infrastructure shown in FIG. 9 is also used to support the "fairies". As described more fully below, each bubble object exhibits one or more behaviour. In addition to the colour behaviour and special behaviour mentioned already, a bubble can exhibit a fairy behaviour. The fairy behaviour has a table of reactions, which define the reaction of the graphs to specific events. The fairy behaviour detects a match 3 event and an explode event. The behaviour of the bubble objects causes that object to register with the event dispatcher to detect certain events. The match 3 event and the explode event are the events for which the fairy behaviour is listening. A fairy manager is an entity which creates the fairies. Each fairy is an entity in itself with location co-ordinates assigned to it. The fairy entity is responsible for rendering the fairy asset on the display, through the Rendering Logic. The fairy entity requests from the fairy manager its new position and then causes the rendering logic to render on the display a fairy flying from its first position to its new position.

Figure 10:
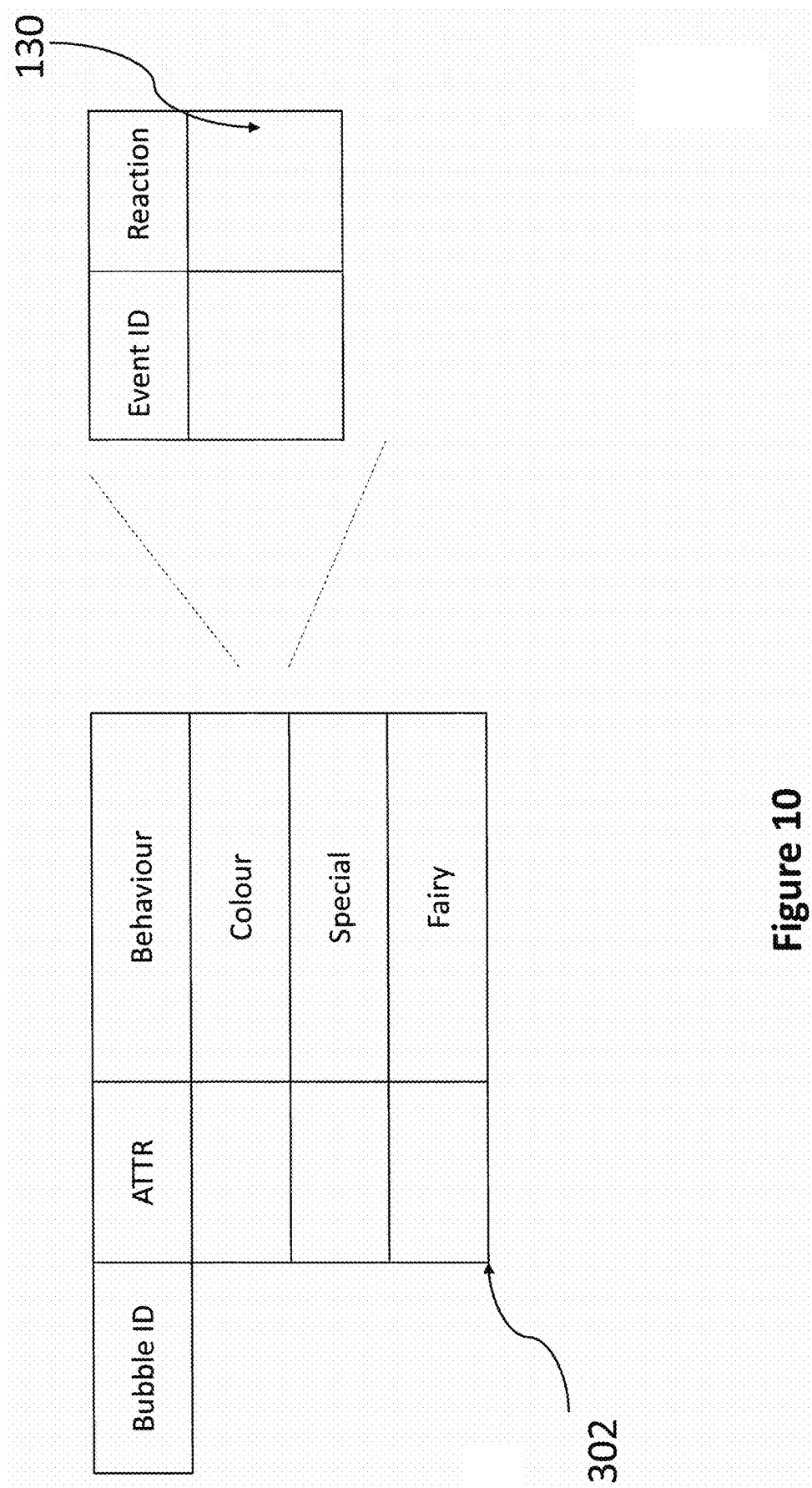
FIG. 10 illustrates the properties of a player (bubble) object.

FIG. 10 illustrates how a bubble object is stored in memory. Each bubble object has a bubble identifier (bubble ID). Each bubble has one or more attributes, each attribute associated with a behaviour. As already mentioned, these behaviours could be for example "colour", "special", "fairy". These behaviours indicate how the bubble will behave responsive to certain events. Each behaviour is implemented by a table of reactions 130, which holds for each possible event identified during event identifier, a reaction to that event. These reactions include animated sequences to be rendered on the display responsive to certain events.

The invention claimed is:

1. A computer device comprising:
   a user interface configured to receive user input engaging with displayed player objects on the user interface;
   a memory storing computer executable code; and
   one or more processors which are configured to execute the computer executable code to carry out a method of controlling the user interface responsive to user engagement with the displayed player objects on the user interface, the method comprising:
      displaying on the user interface a game area having a plurality of game objects in a player graph in which the player objects have a fixed relationship to one another;
      providing on the user interface a first player object configured for targeting and shooting of said game objects in response to user input,
   and further providing on the user interface a marked location associated with an objective, the first player object being configured to respond to the user input to contribute to the objective by being selected by the user to:
      (i) travel along a player-selected trajectory to target one of the plurality of game objects in the player graph, wherein when the one of the game objects which is successfully targeted by the player object has an object characteristic matching the object characteristics of the player object and is adjacent at least one other game object sharing a matching object characteristics, the matching game object, the player object and the at least one other game object are removed from the player graph, wherein the method comprises the step of increasing a contribution to the objective when the matching game object, the player object and at least one of the game objects have been removed from the user interface following a successful targeting of the game object in the player graph; and
      providing on the user interface a second player object configured for targeting and shooting of same game objects in response to user input, the second player object being configured to respond to user input to
      (ii) be selected to contribute directly to the objective and be deselected from targeting the game objects in the player graph wherein the user input to select the player object to contribute to said objective comprises selecting the marked location displayed on the user interface and associated with the objective.

2. The device of claim 1, wherein the marked location is separate from the player graph.

3. The device of claim 1, wherein the method comprises the step of displaying on the user interface in proximity of the marked location a container to represent a holding of player objects which a user has caused to select the marked location.

4. The device of claim 1, wherein the user input to cause selecting of the marked location comprises a direct user interaction with the marked location on the user interface.

5. The device of claim 1, wherein the game objects have object characteristics wherein the player graph comprises game objects of matching characteristics and game objects of differing characteristics.

6. The device of claim 1, wherein the player object is rendered on the user interface with a visual appearance resembling the game objects and a player object characteristic.

7. The device of claim 1 wherein the marked location associated with the objective is visually rendered on the user interface by a targetable game object which resembles game objects of the player graph but which is located in a region of the user interface separate from the player graph.

8. The device of claim 7 wherein the method comprises the step of visually indicating a level of fulfilment of the objective at the marked location on the user interface.

9. The device of claim 7, wherein the method comprises the step of partially shading the targetable game object on the user interface when it is successfully targeted by the player object, to provide a visual indication of a level of fulfilment of the objective.

10. The device of claim 1, wherein multiple player objects are sequentially provided in the game area with randomly selected object characteristics.

11. The device of claim 10, wherein the method comprises the step of providing a finite number of the player objects for each player graph rendered on the user interface, and decrementing the finite number each time one of the player objects is provided in the game area.

12. The device of claim 1, wherein the method comprises monitoring a level of fulfilment towards the objective and detecting that the objective is fulfilled when a threshold score is met.

13. The device of claim 1, wherein each player object comprises an object stored in computer memory having at least one attribute representing a behaviour of the player object, wherein the behaviour is managed by a table of reactions stored in association with the behaviour, the table of reactions defining for an event received by the player object a reaction depending on the event.

14. The device of claim 1, wherein the marked location is managed by a container entity which detects events contributing to the objective and augments a variable stored in a container memory, the variable representing a level of fulfilment to the objective, and the device further comprises
a shooter entity which manages a queue of player objects stored in a shooter memory.

15. The device of claim 1, wherein at least one of the game objects is associated with a releasable icon; the releasable icon is released for association with a different one of the game objects on detection that the at least one game object is in a match condition; and if the different one of the game objects is in a separate match condition game objects of the separate match condition are removed.

16. The computer device of claim 1, wherein said one or more processors are further configured to detect fulfillment of the objective to trigger a boost action.

17. The device of claim 16, wherein the boost action causes a disruptive game element to be released into the game area on the user interface to remove multiple game objects from the player graph.

18. A computer device comprising:
a user interface responsive to user input when engaging with displayed player objects on the interface;
a shooter entity for managing a queue of player objects stored in a shooter memory;
a container entity configured to manage a marked location displayed on the interface and associated with an objective;
rendering logic configured to display a game area on the interface with a plurality of game objects in a static player graph;
an event dispatcher responsive to detecting events of the user input at the user interface, said events being a container type event or a shooter type event, the event dispatcher configured to provide said events selectively to one of the shooter entity and the container entity depending on whether the event is a container type event or a shooter type event; and
game logic for providing first and second player objects configured for targeting and shooting of said plurality of game objects in the static player graph in response to user input, the first player object configured to respond to a detected shooter type event by travelling along a player-selected trajectory to target one of the plurality of game objects in the static player graph wherein when the one of the game objects which is successfully targeted by the player object has an object characteristic matching the object characteristics of the player object and is adjacent at least one other game object sharing a matching object characteristic, the matching game object, the first player object and the at least one other game object are removed from the player graph, to increase a contribution to the objective when the matching game object, first player object and at least one of the game objects have been removed from the user interface following a successful targeting of the game object in the player graph,
the second player object being configured to respond to a detected container type event, in which the user selects the marked location displayed on the user interface and associated with the objective, by being selected to contribute directly to the objective with which the marked location is associated.

* * * * *